US011543947B2

(12) United States Patent
Pahud et al.

(10) Patent No.: US 11,543,947 B2
(45) Date of Patent: *Jan. 3, 2023

(54) ANNOTATION USING A MULTI-DEVICE MIXED INTERACTIVITY SYSTEM

(71) Applicant: Microsoft Technology Licensing, LLC, Redmond, WA (US)

(72) Inventors: Michel Pahud, Kirkland, WA (US); Nathalie Riche, Issaquah, WA (US); Eyal Ofek, Redmond, WA (US); Christophe Hurter, Toulouse (FR); Steven Mark Drucker, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/335,795

(22) Filed: Jun. 1, 2021

(65) Prior Publication Data

US 2022/0011924 A1 Jan. 13, 2022

Related U.S. Application Data

(63) Continuation of application No. 15/640,363, filed on Jun. 30, 2017, now Pat. No. 11,023,109.

(51) Int. Cl.
| | |
|---|---|
| *G06F 17/00* | (2019.01) |
| *G06F 3/04842* | (2022.01) |
| *G06F 3/01* | (2006.01) |
| *G06F 3/0346* | (2013.01) |
| *G06F 3/04815* | (2022.01) |
| *G06F 3/0488* | (2022.01) |

(Continued)

(52) U.S. Cl.
CPC .......... *G06F 3/04842* (2013.01); *G06F 3/011* (2013.01); *G06F 3/013* (2013.01);
(Continued)

(58) Field of Classification Search
CPC ...... G06F 3/04842; G06F 3/011; G06F 3/013; G06F 3/016; G06F 3/0346; G06F 3/04815; G06F 3/0488; G06F 3/167; G06T 19/20
See application file for complete search history.

(56) References Cited

U.S. PATENT DOCUMENTS

| | | | |
|---|---|---|---|
| 8,502,780 B1 * | 8/2013 | Park | G06F 3/0227 345/165 |
| 9,292,184 B2 * | 3/2016 | Hosenpud | G06F 3/03545 |

(Continued)

OTHER PUBLICATIONS

"Office Action Issued in European Patent Application No. 18731666. 6", dated Oct. 5, 2021, 5 Pages.
(Continued)

*Primary Examiner* — Mohammed H Zuberi
(74) *Attorney, Agent, or Firm* — Shook, Hardy & Bacon L.L.P.

(57) ABSTRACT

In various embodiments, methods and systems for implementing a multi-device mixed interactivity system are provided. The interactivity system includes paired mixed-input devices for interacting and controlling virtual objects. In operation, a selection profile associated with a virtual object is accessed. The selection profile is generated based on a selection input determined using real input associated with a selection device and virtual input associated with a mixed-reality device. The selection device has a first display and the mixed-reality device has a second display that both display the virtual object. An annotation input for the virtual object based on a selected portion corresponding to the selection profile is received. An annotation profile based on the annotation input is generated. The annotation profile includes annotation profile attributes for annotating a portion of the virtual object. An annotation of the selected portion of the virtual reality object is caused to be displayed.

20 Claims, 19 Drawing Sheets

(51) Int. Cl.
*G06F 3/16* (2006.01)
*G06T 19/20* (2011.01)

(52) U.S. Cl.
CPC ............ *G06F 3/016* (2013.01); *G06F 3/0346* (2013.01); *G06F 3/0488* (2013.01); *G06F 3/04815* (2013.01); *G06F 3/167* (2013.01); *G06T 19/20* (2013.01); *G06T 2219/004* (2013.01); *G06T 2219/2004* (2013.01)

(56) References Cited

U.S. PATENT DOCUMENTS

| | | | | |
|---|---|---|---|---|
| 9,503,681 | B1* | 11/2016 | Popescu | G06F 40/169 |
| 10,147,243 | B2* | 12/2018 | Yamamoto | G06F 3/011 |
| 2012/0302289 | A1* | 11/2012 | Kang | H04M 1/72412 |
| | | | | 455/557 |
| 2014/0310595 | A1* | 10/2014 | Acharya | G06F 3/04842 |
| | | | | 715/706 |
| 2016/0054791 | A1* | 2/2016 | Mullins | G06T 19/006 |
| | | | | 345/173 |
| 2016/0321841 | A1* | 11/2016 | Christen | G06F 3/167 |
| 2017/0076502 | A1* | 3/2017 | Chen | G06F 3/041 |
| 2018/0246698 | A1* | 8/2018 | Huang | A63F 13/65 |
| 2019/0034076 | A1* | 1/2019 | Vinayak | G06T 19/006 |
| 2019/0180506 | A1* | 6/2019 | Gebbie | G06T 19/20 |

OTHER PUBLICATIONS

"Summons to Attend Oral Proceedings Issued in European Patent Application No. 18731666.6", dated May 18, 2022, 7 Pages.

* cited by examiner

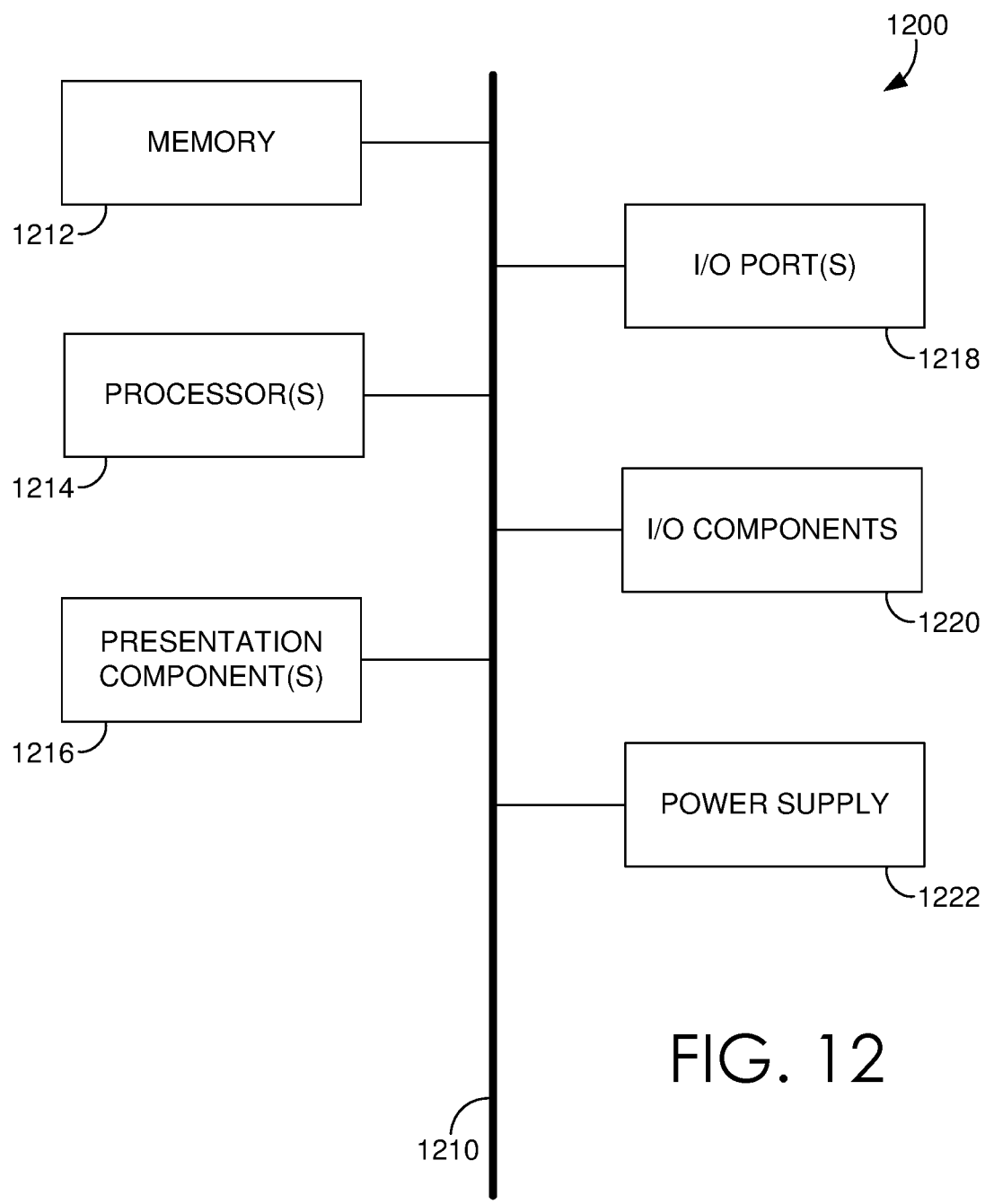

US 11,543,947 B2

ANNOTATION USING A MULTI-DEVICE MIXED INTERACTIVITY SYSTEM

CROSS-REFERENCE TO RELATED APPLICATIONS

This application is a Continuation of U.S. patent application Ser. No. 15/640,363, titled "ANNOTATION USING A MULTI-DEVICE MIXED INTERACTIVITY SYSTEM," filed Jun. 30, 2017, which is incorporated herein by reference in its entirety.

BACKGROUND

Virtual experience computing systems (e.g., virtual reality or augmented reality devices) receive input from input devices to select objects in virtual environments and augmented reality environments (i.e., collectively virtual experiences). For example, a virtual reality controller can be used to make a selection in a virtual experience based on tracking motion of the virtual reality controller, where the motion is communicated to a virtual reality computing system of the virtual experience to indicate the selection. Selecting virtual reality objects or augmented reality objects ("virtual objects") can further be complimented with annotation inputs to associate additional information with the selections. As such, an interactivity system for selection and annotation is an integral part of interacting with virtual experience computing systems.

SUMMARY

Embodiments of the present invention are directed to a multi-device mixed interactivity system for selection and annotation. The multi-device mixed interactivity system ("interactivity system") includes paired mixed-input devices for interacting with and controlling virtual objects using displays, real inputs and virtual inputs, sensors, and passive and active haptic feedback associated with the paired mixed-input devices. Real device space tracker data and virtual device space tracker data is accessed via the paired mixed-input devices, respectively, to determine real input and virtual input that are integrated and processed to determine selection inputs and annotation inputs. The real device space tracker data and virtual device space tracker data are also used in different interaction contexts for determining selection inputs and annotation inputs.

The interactivity system includes an auxiliary mixed-input device (e.g., a selection device or annotation device) and a virtual mixed-input device (e.g., a mixed-reality device). The auxiliary mixed-input device is configured to determine real input based on real device space tracker data associated with the auxiliary mixed-input device. The auxiliary mixed-input device is a mobile device having a first display that displays a virtual object. The virtual mixed-input device is configured to determine virtual input based on virtual device space tracker data associated with the virtual mixed-input device. The virtual mixed-input device is a head-mounted display having a second display that displays the virtual object. The virtual object is an augmented reality object via the second display.

An integrated processing component is configured to determine a selection input or annotation input based on the real input and the virtual input. The selection input is used to determine a selected portion of the virtual object. The annotation input is used to determine an annotation for the virtual object. The integrated processing component includes a selection manager configured to process selection inputs and interfaces and an annotation manager configured to process annotation inputs and interfaces. The integrated processing component is further configured to cause display on the first display associated with the auxiliary mixed-input device the selected portion or the annotation of the virtual object. The integrated processing component is further configured to cause display on the second display associated with virtual mixed-input device the selected portion or the annotation of the virtual object.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein:

FIG. 12 is a block diagram of an exemplary computing environment suitable for use in implementing embodiments of the present invention.

DETAILED DESCRIPTION

Figure 1:
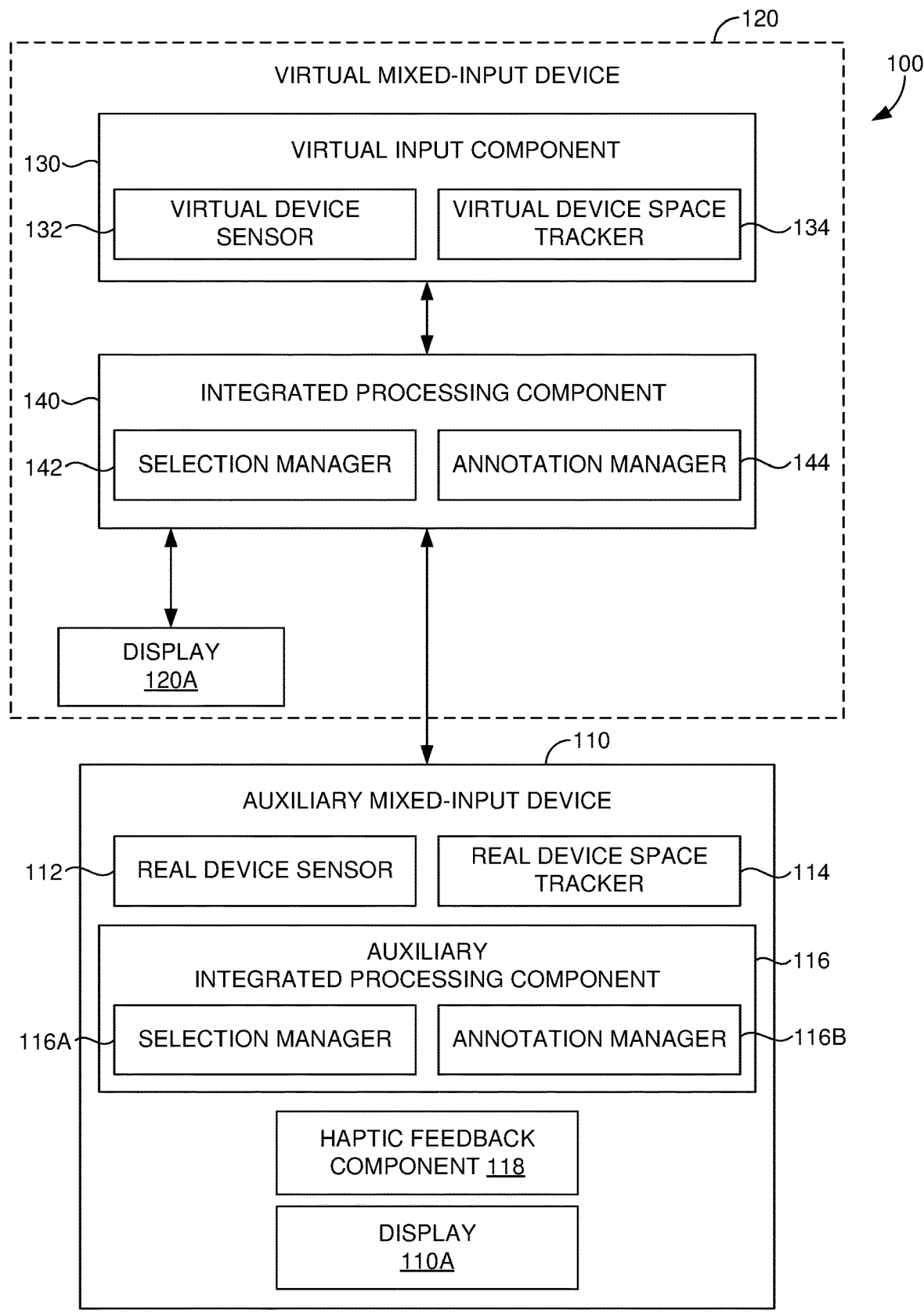
FIG. 1 is a schematic showing an exemplary multi-device mixed interactivity system ("interactivity system"), in accordance with embodiments of the present invention.

Virtual experience computing systems (e.g., virtual reality or augmented reality devices) receive input from input devices to select objects in virtual environments and augmented reality environments (i.e., collectively virtual experiences). An input device can refer to a peripheral used to provide data and control signals for processing via an input processing system of a virtual experience device (e.g., head mounted display device) or mobile device (e.g., smartphone). Virtual experiences (e.g., augmented reality, immersive games or other multidimensional experiences) use different types of input devices. For example, a virtual reality controller can be used to make a selection in a virtual experience based on tracking motion of the virtual reality controller, where the motion is communicated to a virtual reality computing system of the virtual experience to indicate the selection. Selecting virtual reality objects or augmented reality objects ("virtual objects") can further be complimented with annotation inputs to associate additional information with the selections. In particular, selection and annotation of augmented reality objects can be performed using an augmented reality device that supports the presentation of augmented reality images. Augmented reality images include augmented reality objects, which are virtualized objects or entities (e.g., holographic content or mixed-reality content), that are rendered in a real world environment of a user associated with the augmented reality device. The augmented reality objects can be rendered based on the real world environment, where the real world environment can be captured in a digital representation by the augmented reality device. Understanding the real world environment can be based on several different techniques that provide the augmented reality device or mixed-reality device with information about the environment. For example, an environment can be scanned in real-time and a mesh representation of the environment can be dynamically generated to provide the augmented reality device with information about the environment. As such, augmented reality devices can support augmented reality or mixed-reality experiences. Such experiences include selecting in the real world environment augmented reality objects or annotating augmented reality objects in combination with the real world environment. Augmented reality objects can include a hologram catalogue of 3D objects or virtual images that can be placed and scaled around a user. Augmented reality objects can be used in a variety of different implementations (e.g., video games, entertainment, productivity tools, etc.) as entities that can be controlled through a graphical user interface from actuators from the user via the mixed-input pointing device described herein.

With conventional augmented reality virtual computing systems, selecting and annotating virtual objects can be challenging because of the inherent properties of the virtual reality interactivity. At a basic level, selecting a portion of a virtual object can be cumbersome because a selection interface can impede actions associated with making the selection. For example, a user may have to hold their hand in front the virtual object during selection; however the user risks occluding, with their hand, the virtual object being selected. In addition, current selection and annotation methods in virtual reality can also be inconsistent with traditional intuitive computing selection methods that users have become accustomed to in non-virtual computing interfaces. Virtual experiences offer 3D interactivity; however users would like to use familiar 2D data input paradigms. Users in virtual experiences lack traditional tools in virtual experiences, making identifying selections and providing notations in a virtual experience context difficult. For example, the free space display of augmented reality virtual objects provides a singular context for making selections and annotations. As such, a comprehensive interactivity system can be implemented to improve selection and annotation of virtual objects for users in virtual experiences.

Embodiments of the present inventions provide simple and efficient methods and systems for providing a multi-device mixed interactivity system for selection and annotation. At a high level, the multi-device mixed interactivity system ("interactivity system") includes paired mixed-input devices for interacting and controlling virtual objects using displays, real inputs and virtual inputs, sensors, and passive and active haptic feedback associated with the paired mixed-input devices. The interactivity system includes several components including: an auxiliary mixed-input device (i.e., a selection device or annotation device) having a first display, a virtual mixed-input device (i.e., a mixed-reality device) having a second display, an integrated processing component, on the auxiliary mixed input device and/or the virtual mixed-input device, having a selection manager and an annotation manager. Real device space tracker data and virtual device space tracker data is accessed via the paired mixed-input devices, respectively, to determine real input and virtual input that are integrated and processed to determine selection inputs and annotation inputs. The real device space tracker data and virtual device space tracker data are also used in different interaction contexts for determining selection inputs and annotation inputs. An interaction context determines the operations, interfaces and controls for interacting with a virtual object.

In operation, for a selection operation, a selection input associated with a virtual object is accessed. The selection input is based on real input associated with a selection device and virtual input associated with a mixed-reality device. The selection device has a first display that displays the virtual object and the mixed-reality device has a second display that displays the virtual object. A selection profile is generated based on the selection input. The selection profile comprises one or more selection profile attributes for isolating a portion of the virtual object. A selected portion of the virtual object is determined based on the selection profile. The selected portion of the virtual reality object is caused to be displayed on the first display of the selection device.

In operation, for an annotation operation, a selection profile associated with a virtual object is accessed. The selection profile is generated based on a selection input determined using real input associated with a selection device and virtual input associated with a mixed-reality device. The selection device has a first display and the mixed-reality device has a second display that both display the virtual object. An annotation input for the virtual object based on a selected portion corresponding to the selection profile is received. An annotation profile based on the annotation input is generated. The annotation profile includes annotation profile attributes for annotating a portion of the virtual object. An annotation of the selected portion of the virtual reality object is caused to be displayed.

Embodiments of the interactivity system can be described based on a specific exemplary implementation and corresponding components. The features of the embodiment described below are meant to be exemplary and not intended to limit the scope of the invention, unless otherwise stated. At a high level, multi-device mixed interactivity system for selection and annotation uses a mobile device (e.g., tablet, smartphone), in particular a display and user interface (e.g., touchscreen interface) of the mobile device, a mixed-reality device (e.g., head-mounted display) and the display of the mixed-reality device to provide selection operations and annotation operations in augmented reality experiences. It is contemplated that touchscreen interface can refer to a touch surface interface that does not include a display.

Users operating data and visual interfaces often identify portions of the visual interfaces for interaction and selection of specific elements. Embodiments of the present disclosure can be described based on interaction contexts that demonstrate the functionality of the interactivity system. As discussed, selection inputs and annotation inputs are based on real input and virtual input corresponding to real device space tracker data and virtual device space tracker data. In particular, real device space tracker data (e.g., finger motion, display or touchscreen input, smartphone orientation, etc.) can generally refer to data that captured via the mobile device (i.e., auxiliary mixed-input device) and virtual device space tracker data (e.g., hand motion, head motion, eye motion, auxiliary mixed-input device orientation etc.) can generally refer to data that is captured via the HMD (i.e., virtual mixed-input device). The mobile device and HMD can also support casting for further processing selection inputs. For example, casting (e.g., ray-casting or shape-casting) can be identify a portion of the virtual object to be selected or define a volume selection for selection inputs.

Integrating and processing the real input and virtual input supports determining the selection inputs and annotation inputs. An integrated processing component can be implemented via the mobile device and/or the HMD. The mobile device has several sensors that support tracking and the HMD also has several sensors that support tracking to define real input and virtual input for determining selection inputs and annotation inputs. The real device space tracker data and virtual device space tracker data are also used to generate interaction contexts. An interaction context determines the operations, interfaces and controls for interacting with a virtual object. In particular, context-based interfaces can be used to make selection configurations and annotation configurations with corresponding interface elements for the context-based interface.

The interactivity system can support initiating different interaction contexts in order to begin a selection and/or annotation. An interactivity context can be initiated in several ways. For example, a user can execute controls (e.g., gesture, voice, selection input) on a user interface of the mobile device or HMD to initialize an interaction context. User interface as used herein can refer to a mobile device and/or the HMD user interface unless stated otherwise. Based on the interaction context, the mobile device display can operate to display the virtual object using different display configuration. The mobile device display can mirror or substantially mirror (i.e., at least portions of the HMD display of the virtual object are mirrored) the HMD display of the virtual object. In this regard, the mobile device display and the HMD display can be in sync for viewing the virtual object. The mobile device display can be operate independently of the HMD display and further operate to receive selection inputs and annotation inputs and other interaction controls for the virtual object. It is contemplated that the different context can be manually triggered based on user input or automatically triggered based on positioning of the mobile device.

In a freehand device motion selection context, a mobile device can be used as a freehand selection tool (e.g., a lasso) in space. The mobile device is used to make a selection by moving the mobile device to trace a portion of the virtual object for a selection. The user can make a selection by moving the mobile device relative to a virtual object to trace a selection of the virtual object. Relative to a virtual object can refer to moving mobile device across the virtual object projected in the real world or moving the mobile device at a position away from the virtual object with reference to the virtual object. In a device interface selection context, a display of the mobile device can be used for receiving a selection input (i.e., input data). For example, display can be a touchscreen interface that can receive user freehand selection input with reference to a virtual object or a selection input based on predefined selection inputs or other selection inputs for isolating one or more parts of the virtual object.

It is contemplated that the selection can occur directly (i.e., direct interaction) where the mobile device overlaps portions of the display of virtual object for making a selection or indirectly (i.e., indirect interaction) where the mobile device relative to where the virtual object is displayed via the HMD. In addition, a selection input on the virtual object can be performed on a virtual object at different display configuration (i.e., scale or orientation display of the virtual object). For example, the size or orientation of the virtual object can be increased or reduced to improve ease of selection depending on the specific user intent for the selection.

Selection inputs are processed to determine selected portions of the virtual object. In particular, a selection input is used to define a selection profile of the selection input. The selection profile supports isolating a portion of the virtual object. The selection profile can be based on a freehand device motion selection input, freehand selection input via a touchscreen interface, or a selection input of a predefined selection profile. Selection input can be dynamically defined based on different types of real inputs, virtual inputs or additional inputs. A predefined selection profile can be selected from any number of pre-defined shapes (e.g., circle, square, octagon, etc.) that are selectable via the user interface. In this regard, the selection profile can refer to a defined shape that is used for identifying a selected portion of a virtual object.

The selection profile as defined as a shaped can be displayed via the user interface. The selection profile can be displayed on the mobile device display and/or HMD display with reference to the virtual object. The selection profile can include selection attributes which are specific properties of the selection profile. The selection profile attributes can include size, length, display configuration, visualization, haptic feedback, and additional metadata associated with the selection operation. The selection profile includes attributes that instruct on how to isolate, present, and interact with portions of a virtual object. For example, a display configuration attribute of the selection profile can indicate display the selected profile and a visualization attribute indicates how to distinguish a selected portion. The selection profile can be stored as a data structure defined as a selection profile object. The selection profile object stores the attributes of the selection profile. The user interface can support modifying attributes of the selection profile. For example, a size or length of the selection profile can be modified via the touchscreen interface of the mobile device.

The selection input can also be used to define the selection profile that is further augmented as a volume selection (i.e., volume selection attribute) based on the initial selection profile. For example, a selection loop or closed curve selection input can define the selection profile. A volume selection can be generated based on an extrusion of the selection profile. In an exemplary embodiment, the selection profile can be extruded automatically extruded or manually. Further, the selection profile can be extruded in an orthogonal direction from the mobile device, in particular, according to the current mobile device location and orientation. In another exemplary embodiment, the extrusion can simply be longitudinal extrusion of the selection profile.

A selection profile can be based on two selection inputs. A compound selection profile can be generated based on combining of determining an intersection of two selection inputs or two existing selection profiles to generate a selected portion of the virtual object based on both. A compound selection profile can be generated based selection input define by a on a user walking around the virtual object making multiple selections or based on a collaborative selection between two mobile devices. In this regard, the selection profile can be based on selection inputs from multiple perspectives.

The selection profile is used to isolate a portion of the virtual object. A selected portion of the virtual object can be determined based on identifying portions of the virtual object surrounded or enclosed by the selection profile. The selected portion is displayed based on a specific interaction context. For example, the selected portion can be displayed on the mobile device and/or the HMD based on continuing operations with the selected portion. In particular, the selection profile attributes can instruct on how the selected portion is displayed and where to display the selected portion. For example, a visualization attribute can instruct on interface elements (e.g., outlines, color, and text) can be used to display the selected portion.

The interactivity system is operable support several interactivity features to enhance the selection operation, including: selecting and presenting context-based interfaces where specific interface menus are presented based on the interaction context, interface elements that provide visual feedback of the selection operation, haptic feedback for the selection operation, collaborative selection between two mobile devices, additional input modes (e.g., gesture, voice) and mapping of the virtual object display between the mobile device and the HMD. To further describe aspects of the above-identified features by way of examples, a user may scroll through or be presented with different selection menus for providing selection inputs and identify and modifying selection profiles. In order to present a selection menu, the interactivity system determines the active interaction context and provides a selection menu specifically based on the context. The selection menu within a particular interaction context determines the operations and controls for selection inputs and selection profiles interactivity. It is contemplated that the context-based interfaces functionality can be supported via the mobile device or in combination with the HDM device.

Further, with reference to visual feedback, the display of the virtual object can be highlighted with different types of interface elements to show the selection profile, volume selection, the selected portion of the virtual object and further distinguish them from unselected portions of the virtual object. In a collaborative selection, for example, a selection from a first mobile device can be highlighted different from a selection of a second mobile device. It is contemplated that a combination or an intersection of a collaborative selection from two mobile devices can define the identified compound selection profile. The selection operation can also be enhanced with haptic feedback as the user makes selection inputs and identifies and adjust different selection configurations of the selection profile. Haptic feedback can be triggered via the mobile device and/or the HMD. For example, haptic feedback can be generated when performing certain operations or when selecting different subsection of a virtual object.

Several other user interface controls (e.g., gaze, gestures, audio and touch input) can be implemented via the interface to further define, refine, and adjust attributes of the selection profile. For example, the user eye position and the virtual object on the mobile device can define a frustum for making a selection input and corresponding selection profile of the virtual object, in combination with, making an input selection for a position attribute of the selection profile. Speech recognition inputs can also control aspects of the selection operations. For example, a speech command can be used to add or subtract sub-volumes of the selection profile. It is contemplated that a vocabulary for speech commands for additional controls can be defined explicitly for the selection operation to increase rate of success of the specific controls associated with the selection process.

In one embodiment, the mobile device display surface can mapped to the virtual object display in different configurations for receiving selection input. The surface of the mobile device can be mapped as 3D or two-dimensional (2D) interfaces relative to the virtual object. For example, the mapping can be spherical coordinate mapping the volume selection profiles. In this regard, a location of the user's finger is mapped to the space where a selection profile is located to make adjustments to the selection profile. The mapping of the mobile device to the virtual object can be defined such that a display of the virtual object via the HMD is based on input from the touchscreen of the mobile device. For example, when a finger of the user is approaching the touchscreen, the corresponding location is displayed on the display of the virtual object via the HMD. The location can be computed in several different ways. For example, the mobile device display can represent a point of view of the user of the virtual object in the HMD display. The center of the mobile device display can correspond to the center of the user view. In this regard, the user can interface via the mobile device display to a direct mapping to the virtual object in the HMD display (e.g., homographic transformation).

As mentioned, the interactivity system can also support interaction contexts for annotation. In particular, an annotation operation and features are interrelated with the selection operation and features described above. In this regard, the annotation operation is an extension of the selection operation with additional annotation functionality as described below. By way of example, with an annotation operation, a user can provide analysis or communicate information via annotation input that is captured based on annotation profile (i.e., an annotation profile object) associated with a virtual object.

The interactivity system can support initiating an interaction context for annotation, as discussed above. A user can trigger an annotation mode or an annotation mode can be automatically triggered. In a selection profile annotation context, a user can simply select an existing selection profile associated with the virtual object to make an annotation on the selected portion of the virtual object associated with the virtual object using the annotation device. In a freehand slice annotation context, a mobile device can be used to make selection by moving the mobile device to make a selection input based on a slice. A slice refers to a cross-section based representation of the virtual object. A selection profile based on a slice is associated with a selected portion of the virtual object that is represented as a cross section of the virtual object. During selection in the freehand slice annotation context, a display configuration of the virtual object on the mobile substantially mirrors a display configuration of the virtual object on the second display. The selection can be based on a direct interaction with the virtual object on the second display. In a freehand annotation context, a selection can be made similar to freehand device motion selection context, as discussed above. In a stamp annotation context, the annotation is received prior to making a selection. An annotation is received via the touchscreen of the mobile device and stamped (i.e., aligned with the geometry of the virtual object) by placing mobile device (directly or indirectly via an offset) of the virtual object.

Generally, annotation input is received with reference to a selection profile in order to generate an annotation profile. An integrated processing component can be implemented via the mobile device and/or the HMD to support receiving annotation inputs. Different types of annotations that define annotation inputs are contemplated, as described below in more detail. In operation, mobile device has several sensors that support tracking and the HMD also has several sensors that support tracking to define real input and virtual input for determining selection inputs and annotation inputs. The real device space tracker data and virtual device space tracker data are also used to generate the interaction contexts and determine annotation input. The interaction context determines the operations, interfaces and controls for interacting with a virtual object. In particular, context-based interfaces can be used to make annotation configurations with corresponding interface elements for the context-based interface.

The annotation input is used to generate an annotation profile having annotation attributes. The annotation device can support receiving the annotation input using the mobile device. An annotation device operates similarly to a selection device for receiving selection inputs associated with annotations. Annotation inputs are processed to determine annotations for the virtual object. In particular, an annotation input is used to define annotation profile of the selection input or a selection input to be determined (e.g., stamped annotation). The annotation profile functionally operates similar to a selection profile as described above, however the annotation profile further includes attributes associated with the annotation operation and annotation metadata. The annotation profile is similar in that, a selection input prior to incorporating an annotation onto a selection profile of the selection input is based on the selection operation. For example, the selection profile for an annotation profile can be generated based on user-defined selection or a predefined selection generated via the mobile device. Also, predefined selection profile for an annotation profile can be a slice that identifies a singular cross section of the virtual object as a selected portion of the virtual object. It is contemplated that any other predefined selection profiles, as described hereinabove can be used with reference to the annotation profile. In this regard, the selection profile identified to receive an annotation input, and the annotation operation proceeds with generating the annotation profile with annotation.

The user interface can support modifying attributes of the annotation profile. The annotation profile attributes can include annotation notes, annotation type, display configuration, annotation instructions, and additional metadata associated with the annotation operation. An annotation profile can define and display annotations (e.g., an annotation icon, note, input) at specific location with based on the annotation profile. An annotation can be added via mobile device to a selected portion of the virtual object. Annotations can be textual, visual information, video and other types of media. The annotation can be integrated to selected virtual objects. Annotation can be managed, processing, accessed, interacted with and displayed like other types of virtual objects.

It is contemplated that different annotations profiles or annotation can be viewed from different distances. The annotation profile supports managing display and presentation elements of the annotations. For example, annotation instructions determine how the annotations can be retrieved and viewed. For example, an annotation instruction can indicate, for an annotation, the presentation and positioning information for a user to properly view the annotation. A display configuration attribute of the annotation profile can determine how to distinguish an annotation profile from the virtual object. For example, for a virtual object associated with multiple annotations, interface elements can be used to distinguish the different annotation profiles and further highlight an actively selected annotation profile on either displays of the virtual object as a user traverses the different annotation profiles.

The interactivity system can support several interactivity features to enhance the annotation operations, including: selecting and presenting context-based interfaces where specific interface menus are presented based on the context, interface elements that provide visual feedback of the annotation operation, haptic feedback for the annotation operation, collaborative annotation between two mobile devices, additional input modes (e.g., gesture, voice) and mapping of the virtual object display between the mobile device and the HMD. These interactivity features can be consistent with the description above for the selection operation and as such are not further discussed.

The multi-device mixed interactivity system for selection and annotation described above advantageously overcomes some of the shortfalls of conventional virtual reality selection and annotation tools. The solution implements mixed-input devices in combination to allow for improved selection inputs and annotation inputs as described above. The mobile device display also provides a traditional 2D input paradigm, high definition display, and passive and haptic feedback that users are accustomed to for selection and annotation. In addition, the interactivity system provide for flexible context-based interfaces and interactions, such as, the mobile device selectively switching between an augmented reality context and an auxiliary context to support interactions with and controls of a virtual object.

With reference to FIG. 1, embodiments of the present disclosure can be discussed with reference to an exemplary the multi-device mixed-input interactivity system 100 ("interactivity system" 100) that is an operating environment for implementing functionality described herein. The interactivity system 100 includes an auxiliary mixed-input device 110 having a display 110A and an auxiliary integrated processing component 116, a virtual mixed-input device 120 having a display 120A, a virtual mixed-input component 130 and an integrated processing component 140. The auxiliary mixed-input device 120 may include any type of computing device described below with reference to FIG. 12, (which further includes gyroscopes, accelerometers, magnetometers, hover sensors, structured light system etc.)

The virtual mixed-input device 120 can be a head mounted display ("HMD") augmented reality ("AR") device and may be any type of HMD augmented reality device having one or more components of the HMD described below with reference to FIGS. 10 and 11. For detailed discussion purposes, the AR device is an exemplary head mounted display (HMD) device, but other types of augmented reality devices are contemplated with embodiments of the present disclosure. The auxiliary mixed-input device 110, the virtual mixed-input device 120 support implementing the interactivity system 100. A system as used herein refers to any device, process, or service or combination thereof. The system may be implemented using components as hardware, software, firmware, a special-purpose device, or any combination thereof. The system may be integrated into a single device or it may be distributed over multiple devices. The various components of the system may be co-located or distributed. The system may be formed from other mechanisms and components thereof. The components of the interactivity system 100 facilitate determining selection inputs and annotation inputs for selection and annotation operations with reference to virtual objects.

Having identified various components of interactivity system 100, it is noted that any number of components may be employed to achieve the desired functionality within the scope of the present disclosure. The various components of FIG. 1 are shown with lines for the sake of clarity. Further, although some components of FIG. 1 are depicted as single components, the depictions are exemplary in nature and in number and are not to be construed as limiting for all implementations of the present disclosure. Interactivity system 100 functionality can be further described based on the functionality and features of the above-listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Turning to the components of FIG. 1, the auxiliary mixed-input device 110 includes real device sensor 112, real device space tracker 114, auxiliary integrated processing component 166 having selection manager 116A and annotation manager 116B, and haptic feedback component 118. The virtual mixed-input device 120 includes the virtual mixed-input component 130 having the virtual device sensor 132 and virtual space tracker 134. The integrated processing component 140 includes selection manager 142 and annotation manager 144.

At a high level, the virtual mixed-input device 120 can operate to provide a virtual experience. The virtual experience can be an augmented reality experience that generates or display virtual object in a real world environment. The virtual mixed-input device 120 can include additional sensors for tracking motion to make selections and annotations with reference to the virtual experience. The virtual mixed-input device 120 can operate a virtual-mixed input component 130 for providing additional novel functionality associated with embodiments of the present disclosure.

The auxiliary mixed-input device 110 supports generating real-input for the interactivity system 100. The auxiliary mixed-input device 110 operates with the real device sensor 112, real device space tracker 114 and the haptic feedback component 118 to provide the functionality described herein. The real device sensor 112 can be a type of sensor transmitting a signal associated with particular the type of sensor. The real device sensor 112 can also, in addition or in the alternative, operate as a component that accesses sensor data. Different types of sensor data are contemplated with reference the auxiliary mixed-input device. Real device sensor 112 can specifically be associated with wide angle sensor and a hover sensor for capturing different types of movement. The real device space tracker 114 can operate with sensor data to determine real input. The real device space tracker 114 is responsible for identifying and classifying different types of real device space information (e.g., finger motion, display or touchscreen input, smartphone orientation etc.) which can be communicated as real input. Real input can refer to information gathered from the perspective of the auxiliary mixed-input device. The haptic feedback component 116 can provide active haptic feedback during different types of interactions via the auxiliary mixed-input device for real input, virtual input and determined selection inputs and annotation inputs. The auxiliary mixed-input device 110 supports a display 121A for displaying virtual objects and supporting functionality in accordance with embodiments described herein.

The virtual mixed-input device 120 supports generating virtual input for the interactivity system 100. The virtual mixed-input device 120 operates with the virtual device sensor 132 and the virtual device space tracker 134 to provide the functionality described herein. The virtual device sensor 132 can be a type of sensor transmitting a signal associated with the particular type of sensors. The virtual device sensor 132 can also, in addition or in the alternative, operate as a component that accesses sensor data. Different types of sensor data are contemplated with reference the virtual mixed-input device. The virtual device space tracker 134 can operate with sensor data to determine virtual input. The virtual device space tracker 134 is responsible for identifying and classifying different types of virtual device space information (e.g., hand motion head motion, eye motion, smartphone orientation etc.) which can be communicated as virtual input. Virtual input can refer to information gathered from the perspective of the virtual mixed-input device. The virtual mixed-input device 120 supports a display 120A for displaying virtual objects and supporting functionality in accordance with embodiments described herein.

The auxiliary integrated processing component 116 and the integrated processing component 140 (collectively "mixed-input integrated processing components") support generating selection inputs and annotation inputs for the interactivity system 100. The integrated mixed-input processing components can receive the real input and virtual input to determine selection input and annotation input for a virtual object.

The mixed-input integrated processing components can further use the real input and virtual input via their respective selection managers and annotation managers to support different types of interaction contexts as discussed in more detail below. For example, the auxiliary integrated processing component 116 can operate with the selection manager 116A and the annotation manger 116B to provide interaction contexts associated with the auxiliary mixed-input device 110 while the integrated processing component 140 can operate with the selection manager 142 and annotation manager 144 to provide interaction contexts associated with the virtual mixed-input device 120. The mixed-input integrated processing components can access, receive or generate the real input and the virtual input to determine the virtual space input. The selection managers and annotation managers can operate to selectively or automatically generate different types of interaction contexts based on real device space tracker data and virtual device space tracker data. The auxiliary integrated processing component 116 can support can selectively switching the display between an augmented reality context and an auxiliary context to support interactions with and controls associated with virtual object.

Embodiments described herein can further be described based on exemplary selection and annotation operations and interfaces provided based on components of the interactivity system 100. For example, the interactivity system 100 can support selection contexts and interfaces and annotation contexts and interfaces via the auxiliary mixed-input device 110 (e.g., selection device or annotation device) and the virtual mixed-input device 120. The display 110A of the auxiliary mixed-input device 110 can automatically or manually switch between an augmented reality context and an auxiliary context to support selection inputs and annotation inputs for a virtual object. Similarly, the display 120A of the virtual mixed-input device 120 can automatically or manually switch between an augmented reality context and an auxiliary context to support selection inputs and annotation input for a virtual object. Real input based on real device space tracker data and virtual input based on virtual device space tracker data can be generated via auxiliary mixed-input device 110 and the virtual mixed-input device respectively. Real device space tracker data and virtual device space tracker data can be associated with different types of interaction contexts that further define the real input and the virtual input that are integrated and processed to generate a selection input or an annotation input, where tracker data is determined based at least in part on sensor data. The selection input or an annotation input is managed, based on a determined context, using the auxiliary integrated process component 116 and specifically the selection manager 116A or the annotation manager 116B and similarly, the selection input or an annotation input is managed, using the integrated processing component 140 and specifically the selection manager 142 or the annotation manager 144. As used herein, managing can refer to accessing, receiving, processing, referencing, communicating, comparing, translating, triggering, computing instructions, messages, interactivity features and causing display of virtual objects in accordance with embodiments of the present disclosure.

With reference to FIGS. 2A, 2B, 2C, 3A, 3B, 4A, 4B, and 5A-5D illustrate exemplary selection and annotation contexts and operations for performing functionality of the interactivity system 100. At a high level, the interactivity system 100 can operated by a user 202 with a mobile device 210 (e.g., auxiliary mixed-input device 110—a selection device or annotation device) having a display 210A and an HMD 220 (e.g., a mixed-reality device) having a display 220A. The display 210A and the display 220A are operable to display the virtual object 230. The mobile device 210 configured to determine real input based on real device space tracker data associated with mobile device 210. The HMD 220 is configured to determine virtual input based on virtual device space tracker data associated with the HMD 220. The virtual object 230 is an augmented reality object via the second display. The display 210A can automatically or manually switch between an augmented reality context and an auxiliary context to support selection inputs and annotation inputs for a virtual object. Similarly, the display 220A can automatically or manually switch between an augmented reality context and an auxiliary context to support selection inputs and annotation input for a virtual object, as discussed herein in more detail.

An integrated processing components (e.g., auxiliary integrated processing component 116 and integrated processing component 140) are configured to determine a selection input or annotation input based on the real input and the virtual input. The selection input is used to determine one or more selected portions of the virtual object based on a selection profile. The annotation input is used to determine one or more annotations for the virtual object based on an annotation profile.

Figure 2A:
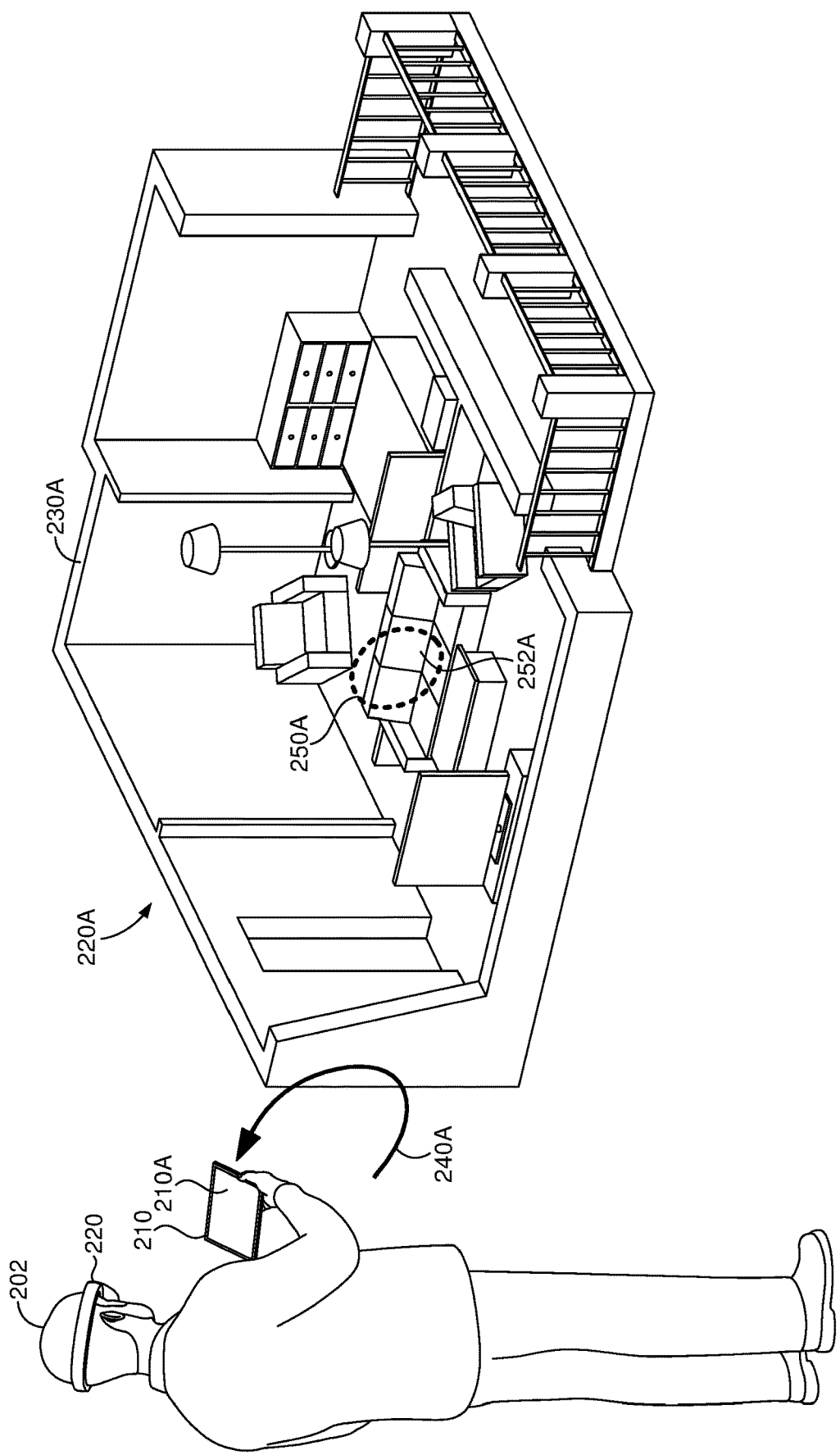
FIGS. 2A-2C are illustrations of interaction contexts for selection and/or annotation with an interactivity system, in accordance with embodiments of the present invention.

With reference to FIG. 2A, the user 202 is making a freehand selection 240A that defines a selection input. The selection input is used to determine the selected portion of the virtual object 230A. The user 202 is making the freehand selection 240A based on moving the mobile device 210. The user 202 is making the selection relative to the virtual object 230A in that the mobile device 210 is not intersecting the virtual object 230A but instead the mobile device 210 is positioned away from the virtual object 230. Based on tracker data (e.g., virtual device space tracker data and real space tracker data) a selection input is identified and a selection profile 250A is generated with reference to the virtual object 230A. The selection profile 250A is used to identify a selected portion 252A. It is contemplated that the display 210A or the display 220A can display and highlight the selected portion 252A.

Figure 2B:
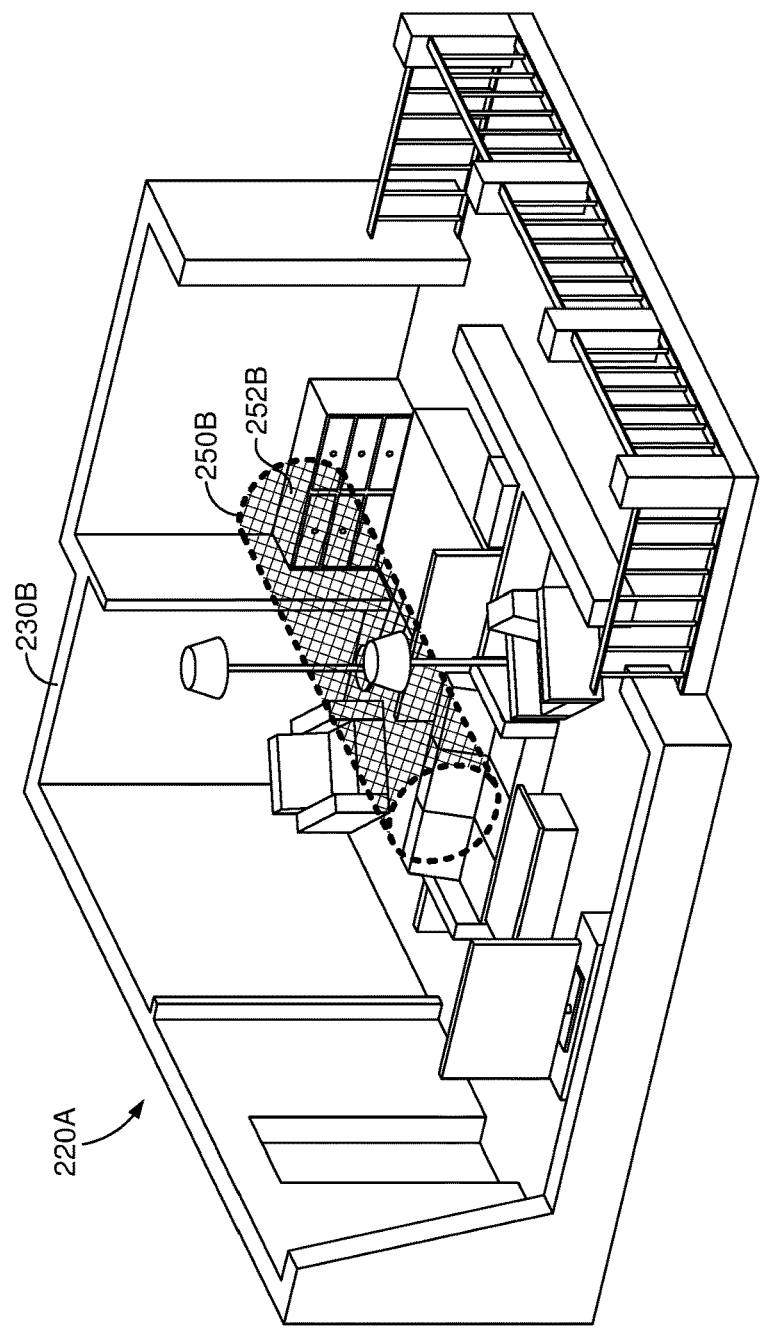
Figure 2B:
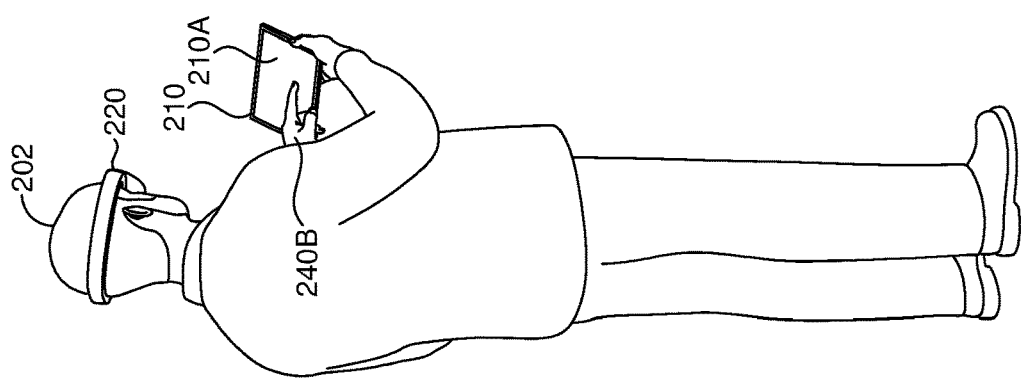

With reference to FIG. 2B, the user 202 is making a freehand touchscreen selection 240B that defines the selection input. The selection input is used to determine a selected portion of the virtual object 230B. The user 202 is making the freehand selection 240A based on a touchscreen input on the mobile device 210. The user 202 is making the selection relative to the virtual object 230B in that the mobile device 210 is not intersecting the virtual object 230B but the mobile device 210 is position away from the virtual object 230B. Based on tracker data (e.g., virtual device space tracker data and real space tracker data) a selection input is identified and a selection profile 250B is generated with reference to the virtual object 230B. The selection profile can be a volume selection generated based on an initial selection profile. As shown, the extrusion to create the volume selection is based a longitudinal extrusion. The selection profile 250B including the volume selection based on the extrusion is used to identify a selected portion 252B. As shown, the mobile device 210 by way of the touchscreen or display 210A can be mapped to a virtual object display in different configurations for receiving selection input or annotation input. For example, a touch surface of the mobile device 210 can be mapped as a 3D or two-dimensional (2D) interface relative to a virtual object. Several other mapping techniques are contemplated and described hereinabove.

Figure 2C:
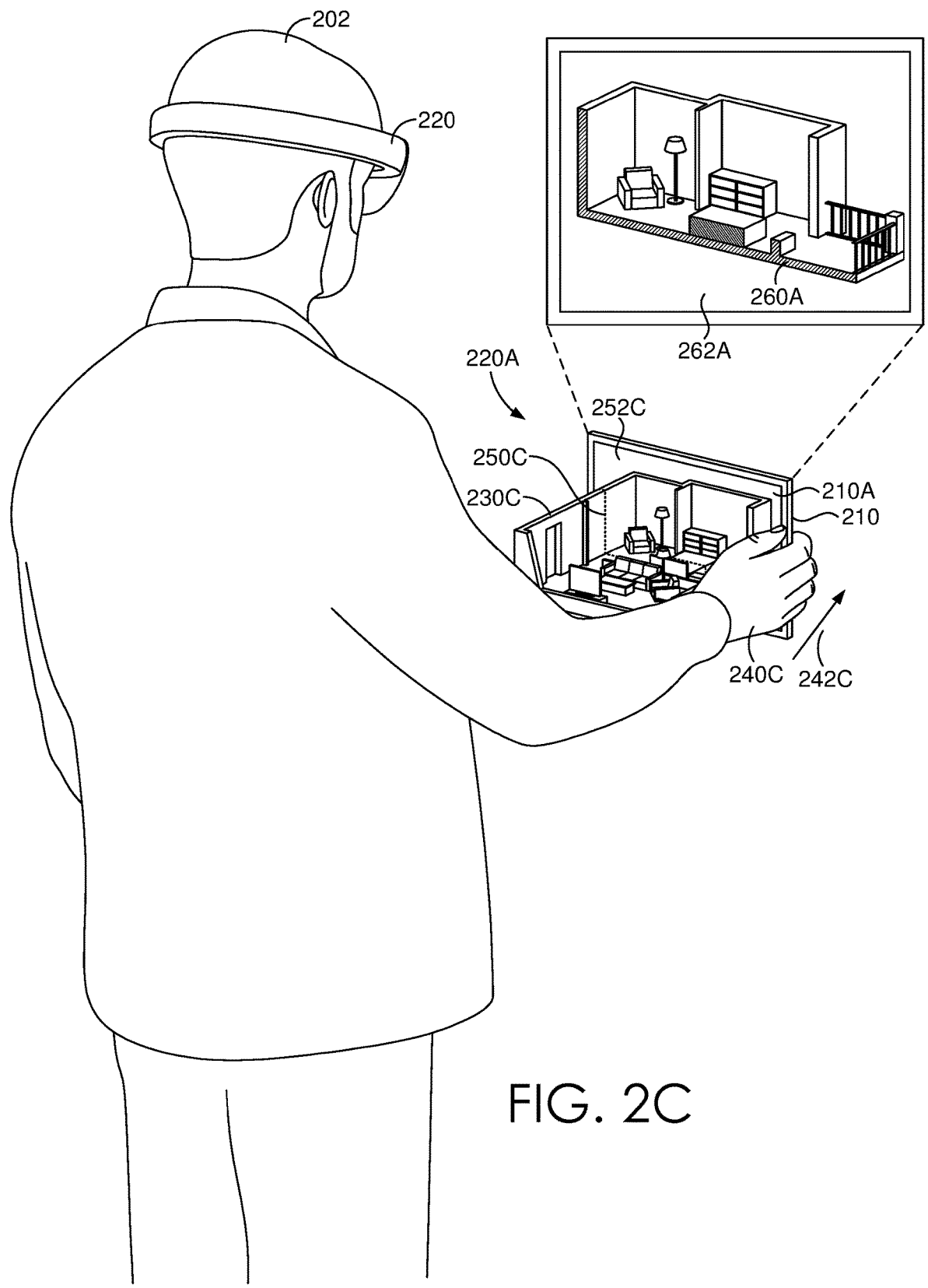

With reference to FIG. 2C, the user 202 is making a direct selection 240C that defines the selection input. The direct selection 240C is made from a first perspective 242C. The selection input is used to generate a selection profile 250C the virtual object 230C. The direct selection 240C includes the mobile device 210 intersecting portions of the virtual object 230C on the display 220A. In addition, the selection input for the virtual object 230C is performed at a different display configuration (i.e., scale or orientation display of the virtual object) compared to the virtual object 230B in FIG. 2B. As shown, the size of the virtual object has reduced to improve ease of selection. Based on tracker data (e.g., virtual device space tracker data and real space tracker data) a selection input is identified and a selection profile 250C is generated with reference to the virtual object 230C. The selection profile 250C is used to identify a selected portion 252C. It is contemplated that the display 210A or the display 220A can display and highlight the selected portion 252C. The selection profile 250C can further be incorporated into an annotation profile 260A in accordance with embodiments of the present invention. The annotation profile 260 has a corresponding selected portion 262A that is defined in an annotation context for a corresponding annotation operation such that the user 202 can provide analysis or communicate information via annotation input that is captured based on annotation profile 260. The selected portion 262A is based on a slice that identifies a singular cross section of the virtual object 230C as a selected portion of the virtual object 230C.

Figure 3A:
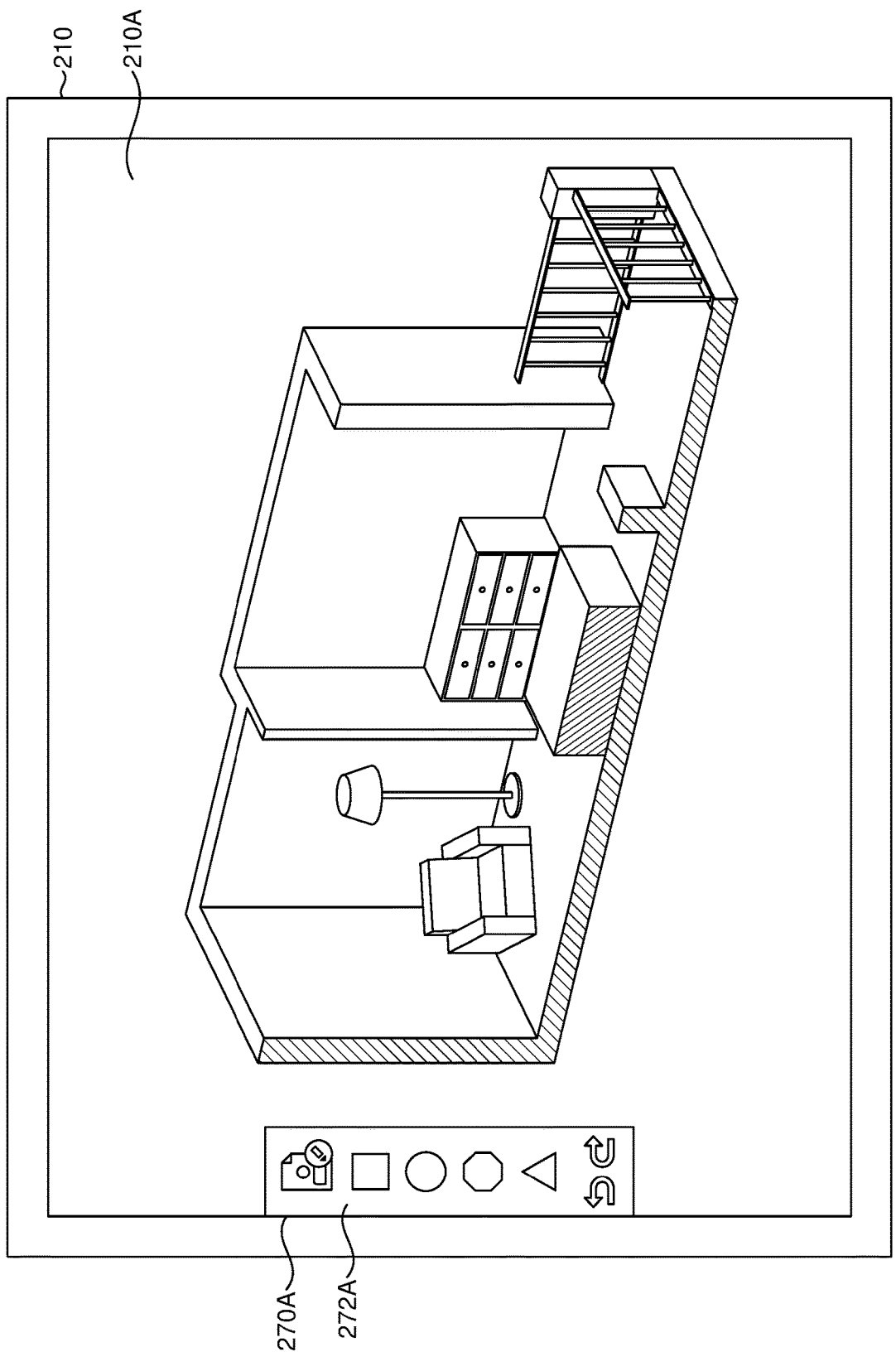
FIGS. 3A and 3B are illustrations of interaction contexts for selection and/or annotation with an interactivity system, in accordance with embodiments of the present invention.
Figure 3B:
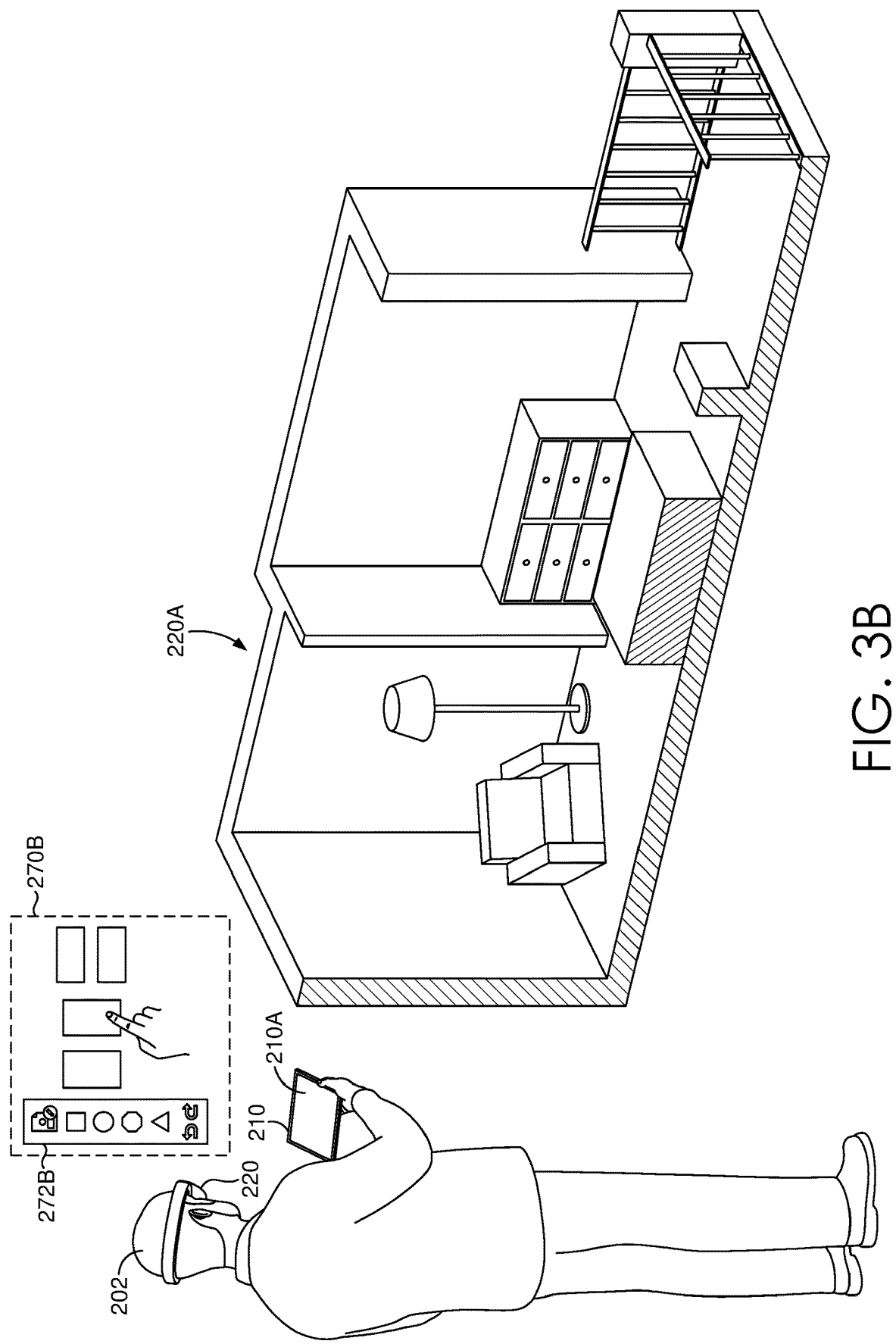

With reference to FIGS. 3A and 3B, the illustrations are consistent with the above-discussed FIGS. 2A-2C in that the mobile device 210 includes the display 210A. In particular, FIG. 3A illustrates an exemplary interactivity interface 270A on the display 210A with virtual object 230C. The interactivity interface 270A using the mobile device 210 supports interactivity features to enhance selection operations and annotation operations, including: selecting and presenting context-based interfaces where specific interface menus are presented based on the context, interface elements that provide visual feedback of the selection operation, haptic feedback for the selection operation, collaborative selection between two mobile devices, additional input modes (e.g., gesture, voice) and mapping of a virtual object display between a mobile device and an HMD. For example, the selection profile interface 272A illustrates an interface to support selecting a selection profile from any number of pre-defined shapes (e.g., circle, square, octagon, etc.). Additional selection inputs via the interactivity interface 270A can be used to also be used to define the selection profile that is further augmented as a volume selection (i.e., volume selection attribute) based on the initial selection profile.

Turning to FIG. 3B, FIG. 3B illustrates an exemplary interactivity interface 270B on the display 220A of HMD 220. The interactivity interface 270B using the HMD 220 supports interactivity features to enhance selection operations and annotation operations, supports interactivity features to enhance selection operations and annotation operations, including: selecting and presenting context-based interfaces where specific interface menus are presented based on the context, interface elements that provide visual feedback of the selection operation, haptic feedback for the selection operation, collaborative selection between two mobile devices, additional input modes (e.g., gesture, voice) and mapping of a virtual object display between a mobile device and an HMD. For example, the selection profile interface 272B illustrates an interface to support selecting a selection profile from any number of pre-defined shapes (e.g., circle, square, octagon, etc.). Additional selection inputs via the interactivity interface 272B can be used to also be used to define the selection profile that is further augmented as a volume selection (i.e., volume selection attribute) based on the initial selection profile.

Figure 4A:
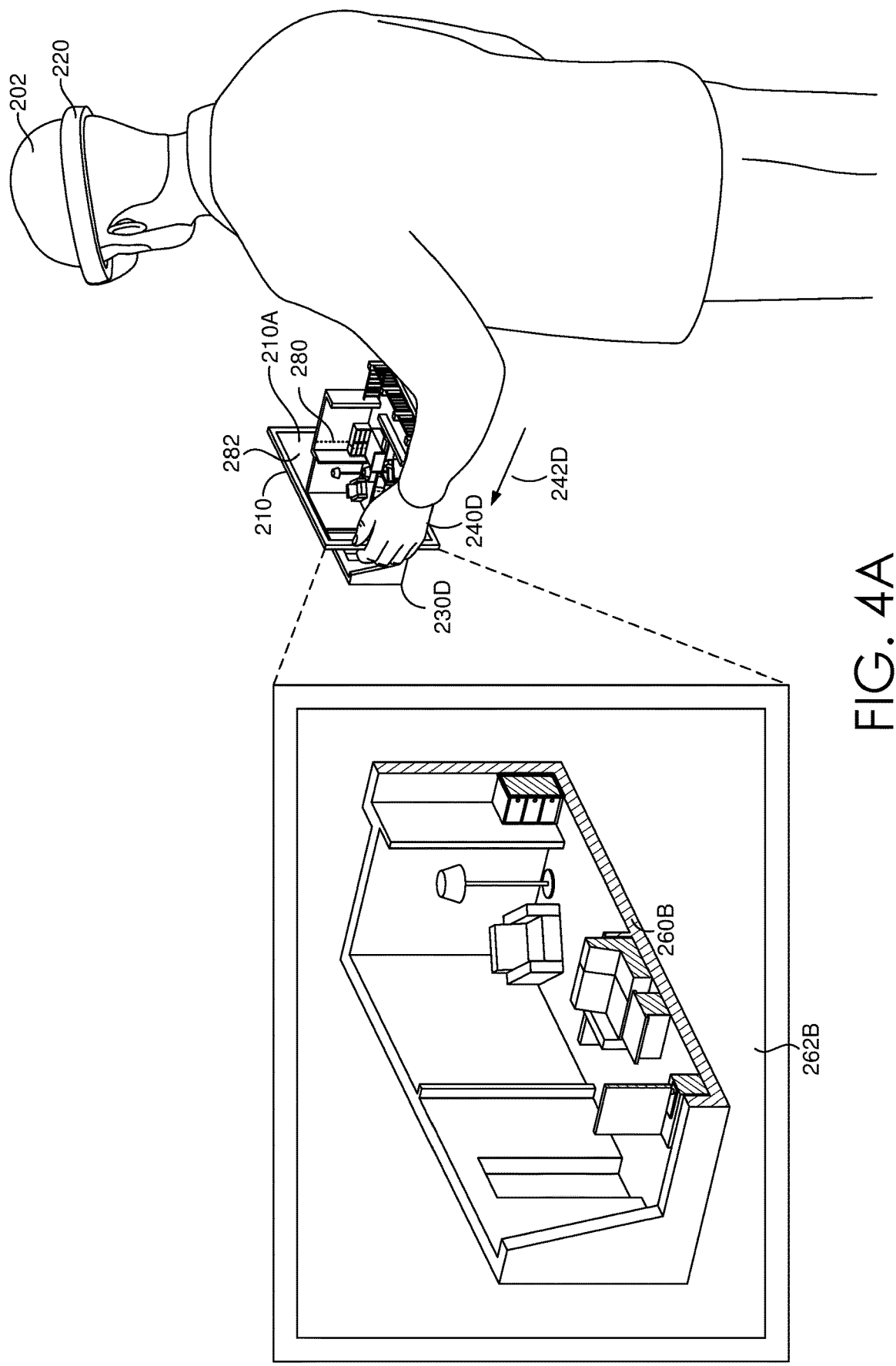
FIGS. 4A and 4B are illustrations of interaction contexts for selection and/or annotation with an interactivity system, in accordance with embodiments of the present invention.
Figure 4B:
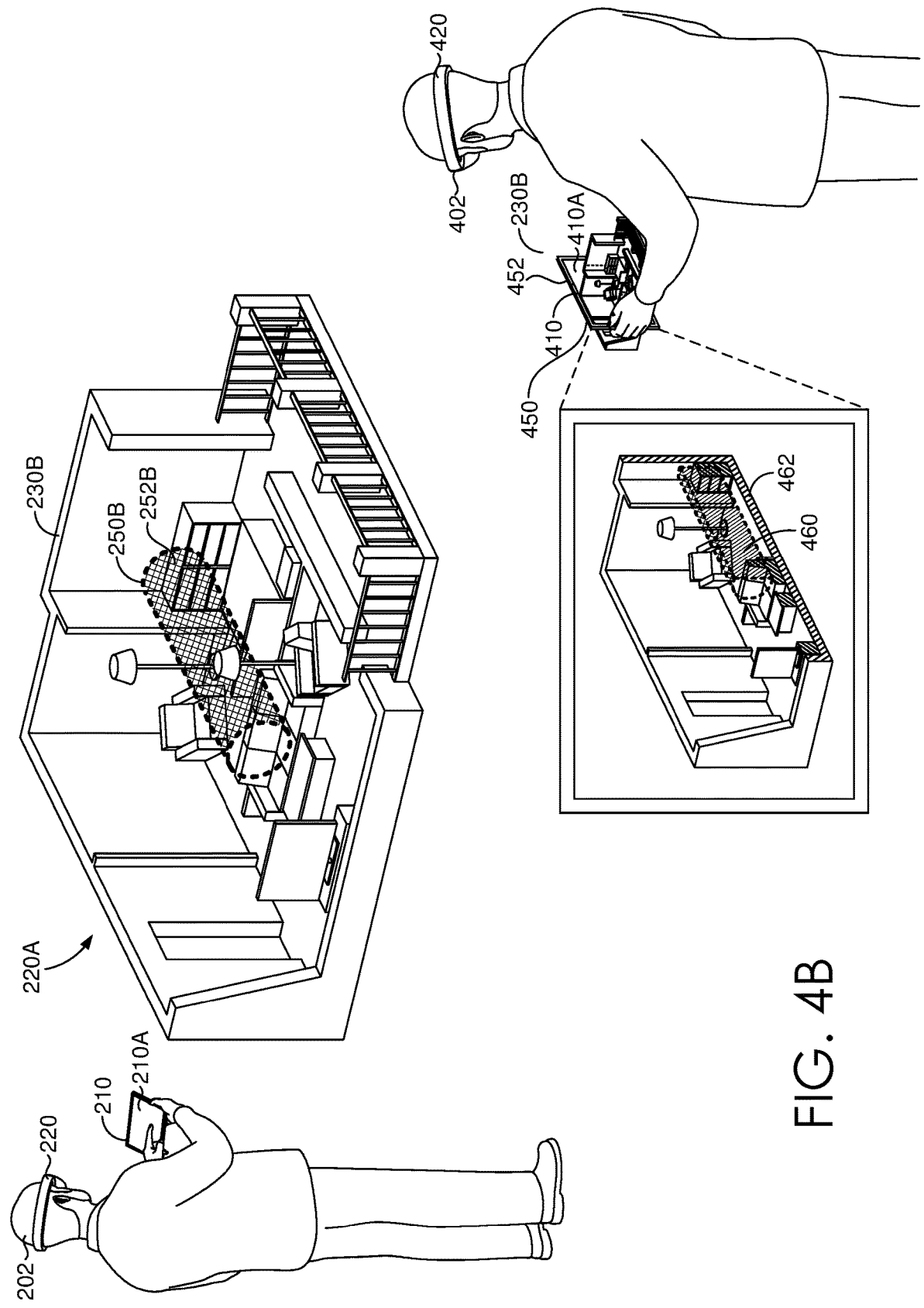

With reference to FIGS. 4A and 4B, FIGS. 4A and 4B illustrates contexts and operations in accordance with embodiments of the present disclosure. In FIG. 4A, the user 202 is making another direct selection 240D that defines the selection input. The direction selection is from a second perspective 242D. The selection input is used to generate a selection profile 280 of the virtual object 230D. The selection profile 280 is used to identify a selected portion 282. The selection profile 250C can further be incorporated into an annotation profile 260B in accordance with embodiments of the present invention. The annotation profile 260B has a corresponding selected portion 262B.

With reference to FIG. 4B, FIG. 4B further illustrates a collaboration context (e.g., multi-user) and further an exemplary compound selection profile which can be used for generating a compound annotation profile. It is contemplated that a compound selection profile or a compound annotation profile can be generated from combining selection inputs or combining annotation inputs. As shown, the user 202 can operate mobile device 210 via the display 210A for a selection input for virtual object 230B to generate a selection profile 250B and selection portion 252B. The user 402 can operate mobile device 410 via the display 410A for a selection input for virtual object 230 to generate a compound selection profile 450 and compound selection portion 452. A compound annotation profile 460 can correspond to a compound selected portion 462.

Figure 5A:
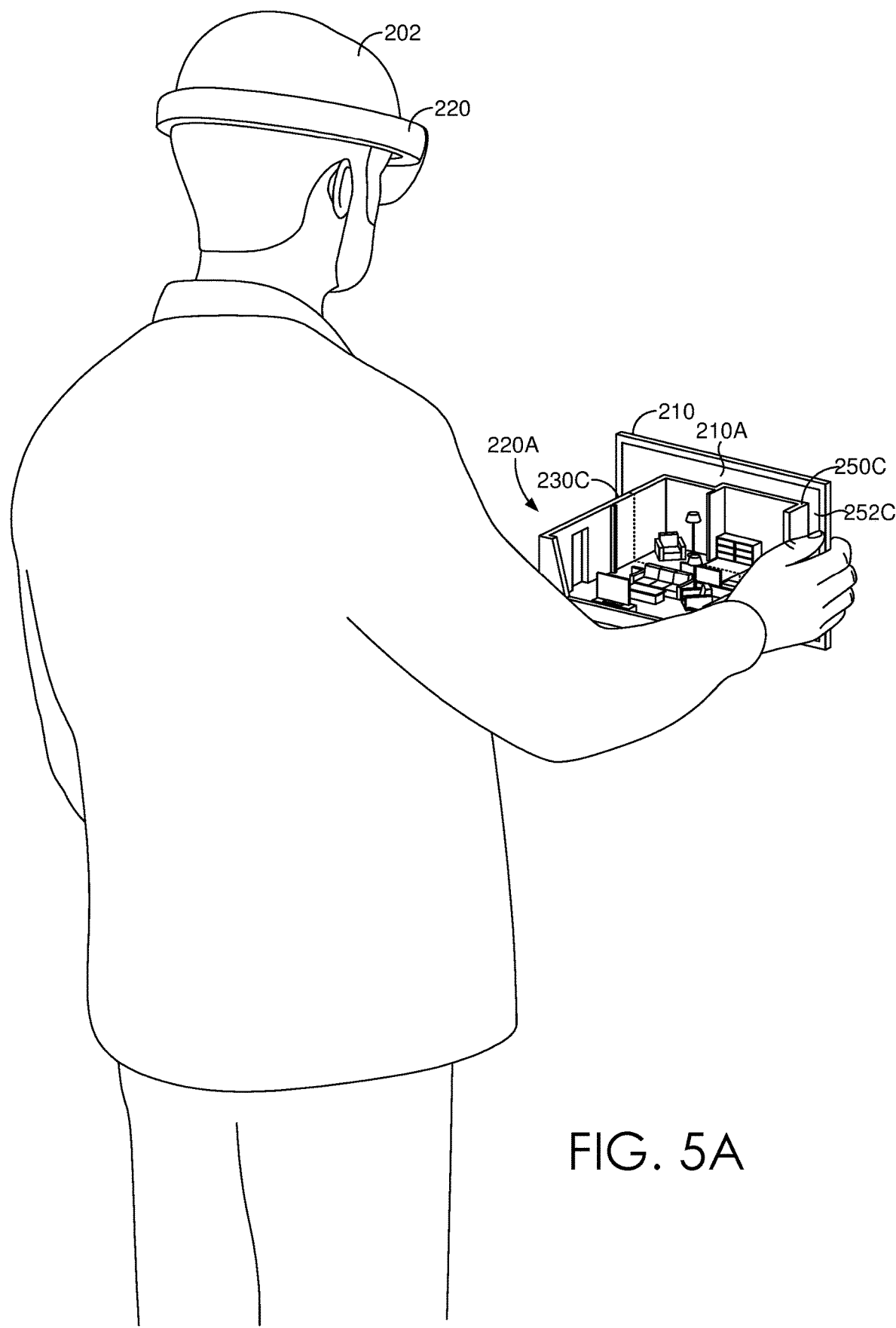
FIGS. 5A-5D are illustrations of interaction contexts for selection and/or annotation with an interactivity system, in accordance with embodiments of the present invention.

With reference to FIGS. 5A-5D, FIGS. 5A-5D illustrates contexts and operations in accordance with embodiments of the present disclosure of the present disclosure. In FIG. 5A, based on the interaction context, the display 210 has a display configuration of the virtual object that substantially mirrors a display configuration of the virtual object on the second display. It is contemplated that in a different interaction context, a second interaction context, the display configuration of the virtual object 230C on a first display is independent of the display configuration of the virtual object on a second display.

Figure 5B:
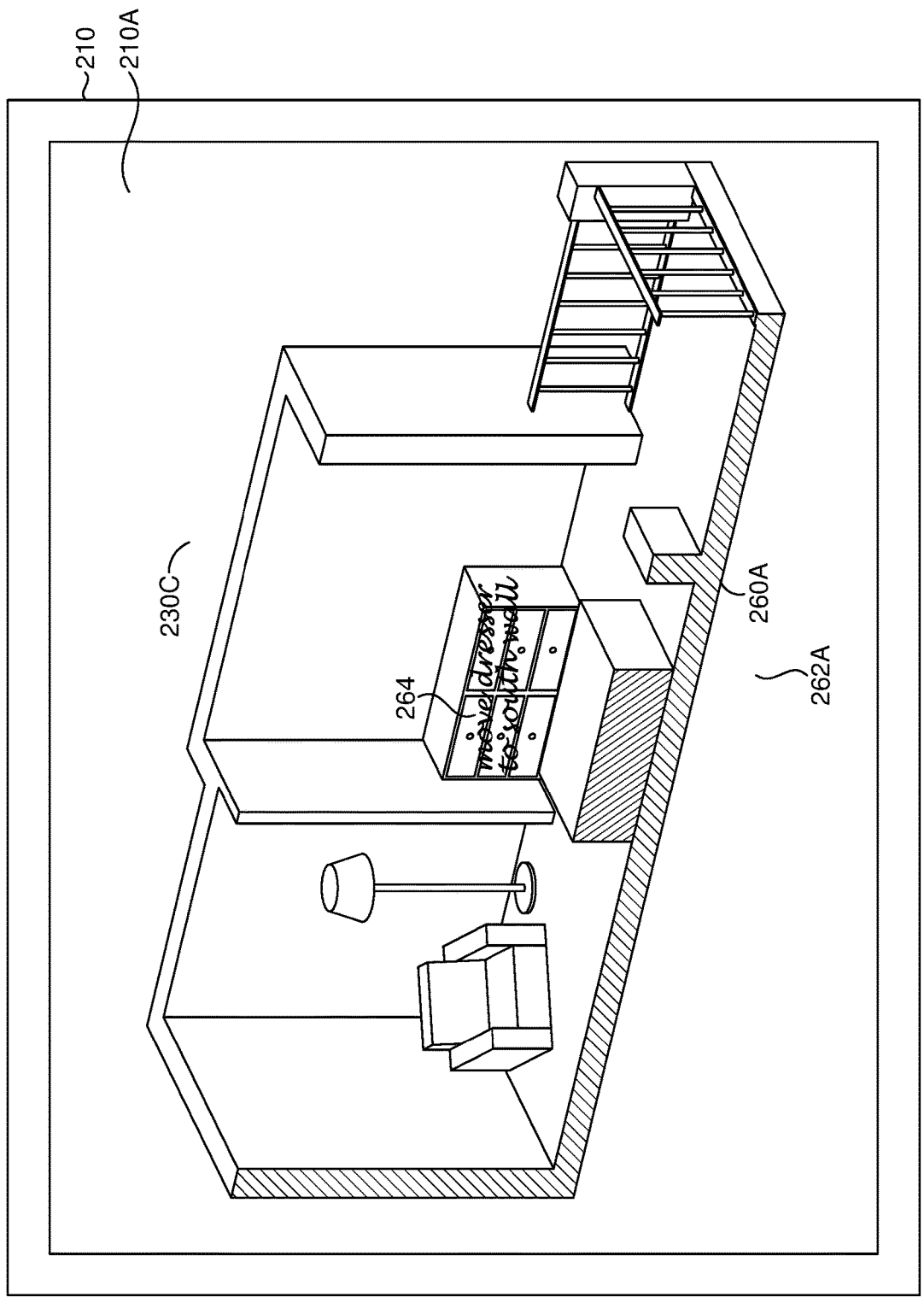

With reference to FIG. 5B, it further contemplated that an annotation input can be received before receiving a selection input (e.g., stamp annotation context) or after receiving a selection input (e.g., freehand slice annotation content). In either case, an annotation profile 260 is generated based on the annotation input for the selected portion 262A and an annotation 264 of the annotation profile 262A in combination with a selected portion 262A of the virtual object 230C based on the annotation profile 260A on the display 210A of the mobile device 210.

Figure 5C:
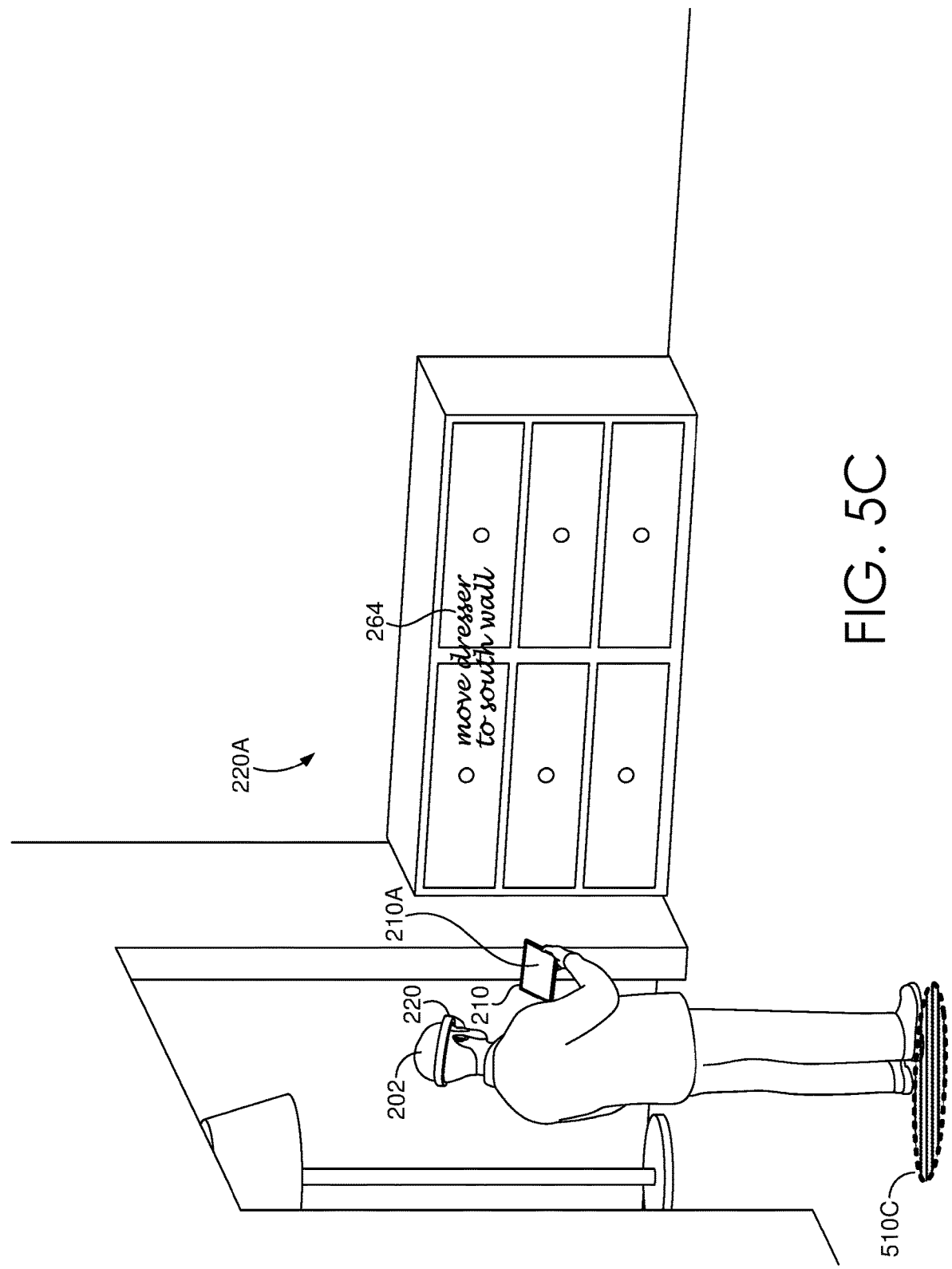
Figure 5D:
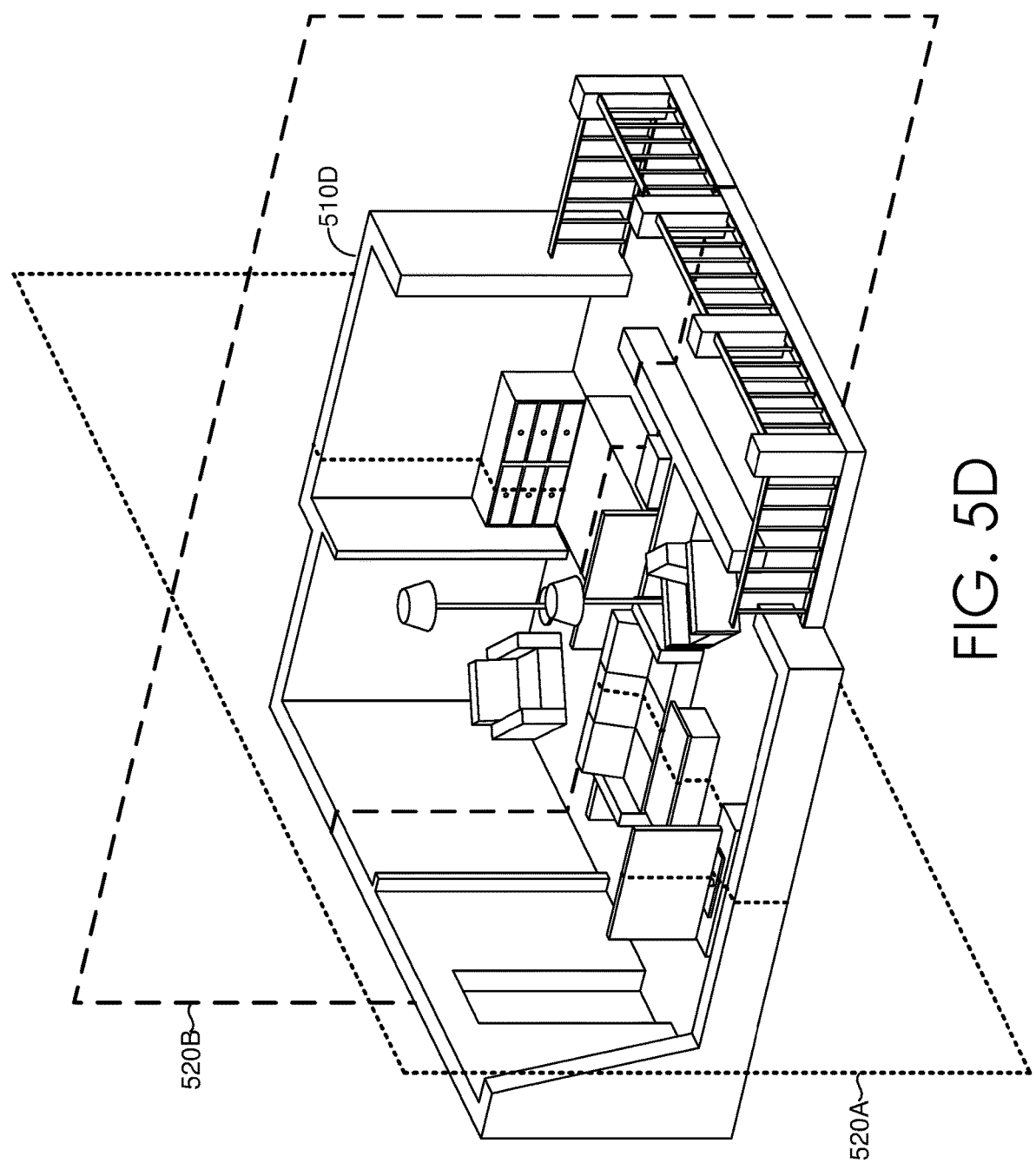

With reference to FIG. 5C, an annotation profile supports managing display and presentation elements of the annotations. For example, annotation instructions determine how the annotations can be retrieved and viewed. It is contemplated that different annotations profiles or annotation can be viewed from different distances. As shown, the user 202 is in a designated location 510C for viewing the annotation 264 via the display 220A and can further modify the annotation 264 based on one or more input interfaces including a gaze-based input interface, a speech-based input interface via the HMD 220 or a mapped-based input interface for receiving the additional input. The mapped-based selection is based on a mapping between a display 210A of the mobile device 210 relative to the virtual object on the second display. Further, with reference FIG. 5D, a display configuration attribute of the annotation profile can determine how to distinguish an annotation profile from the virtual object. For example, as shown the virtual object 510D is with multiple annotations profiles (e.g., annotation profile 520A and annotation profile 520B) generated with interface elements. In one exemplary embodiment the interface elements can be used to distinguish the different annotation profiles and further highlight or link an actively selected annotation profile on a display of the virtual object as a user traverses the different annotation profiles.

With reference to FIGS. 6, 7, 8 and 9, flow diagrams are provided illustrating methods for implementing interactivity systems. The methods can be performed using the interactivity system described herein. In embodiments, one or more computer storage media having computer-executable instructions embodied thereon that, when executed, by one or more processors, can cause the one or more processors to perform the methods in the interactivity system. The interactivity system 100 includes, amongst other components, an auxiliary mixed-input device 110 having a display 110A, a virtual mixed-input device 120 having a display 120A and mixed-input integrated processing components.

Figure 6:
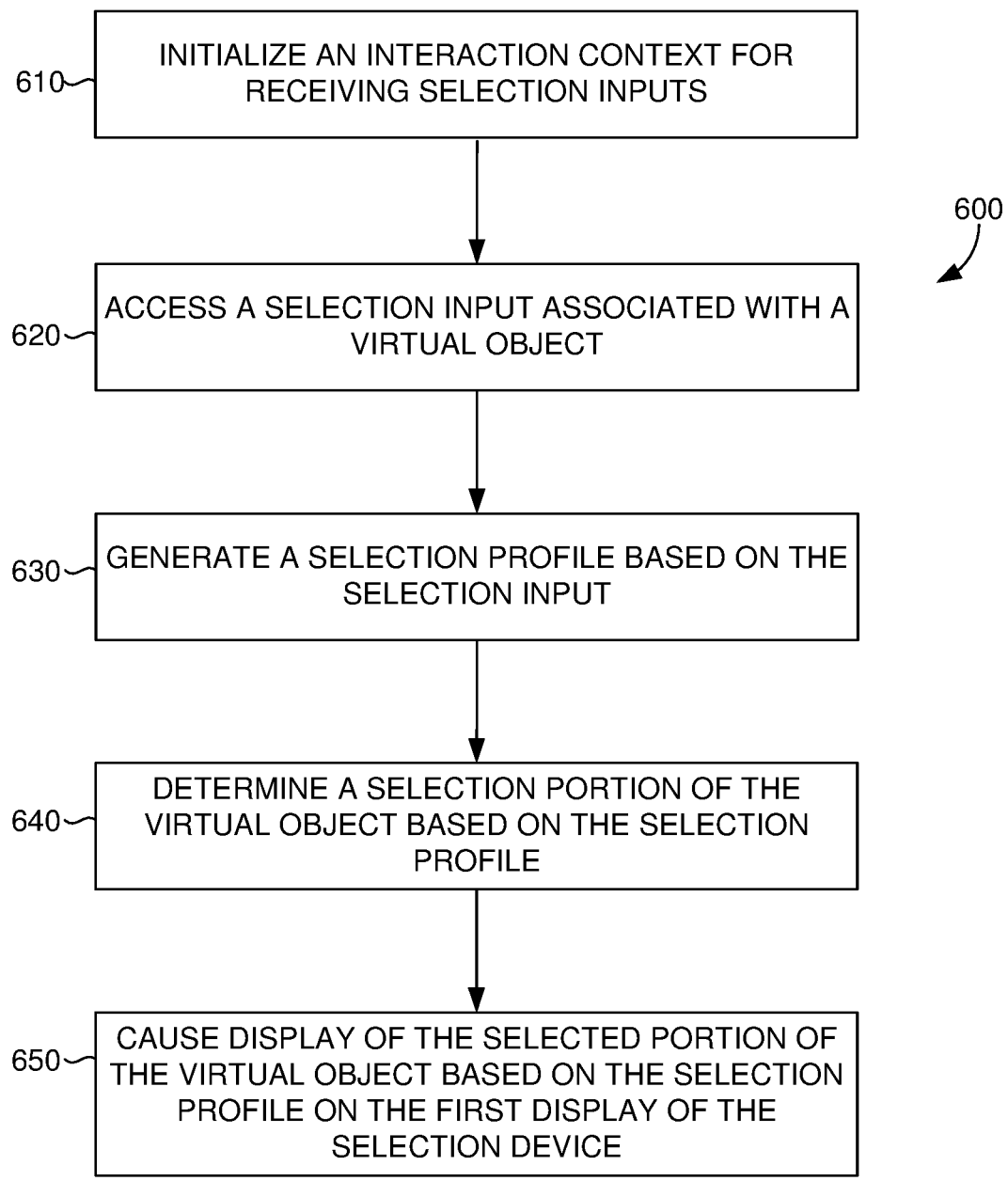
FIG. 6 is a flow diagram showing a method for implementing an interactivity system, in accordance with embodiments of the present invention.

Turning to FIG. 6, a flow diagram is provided that illustrates a method 600 for executing implementing for implementing interactivity systems. Initially at block 610, an interaction context for receiving selection inputs is initialized. At block 620, a selection input associated with a virtual object is accessed. The selection input is based on real input associated with a selection device and virtual input associated with a mixed-reality device, the selection device having a first display that displays the virtual object and the mixed-reality device having a second display that displays the virtual object. At block 630, a selection profile is generated based on the selection input. The selection profile comprises one or more selection profile attributes for isolating a portion of the virtual object. At block 640, a selected portion of the virtual object is determined based on the selection profile. At block 650, the selected portion of the virtual object based on the selection profile is caused to be displayed on the first display of the selection device.

Figure 7:
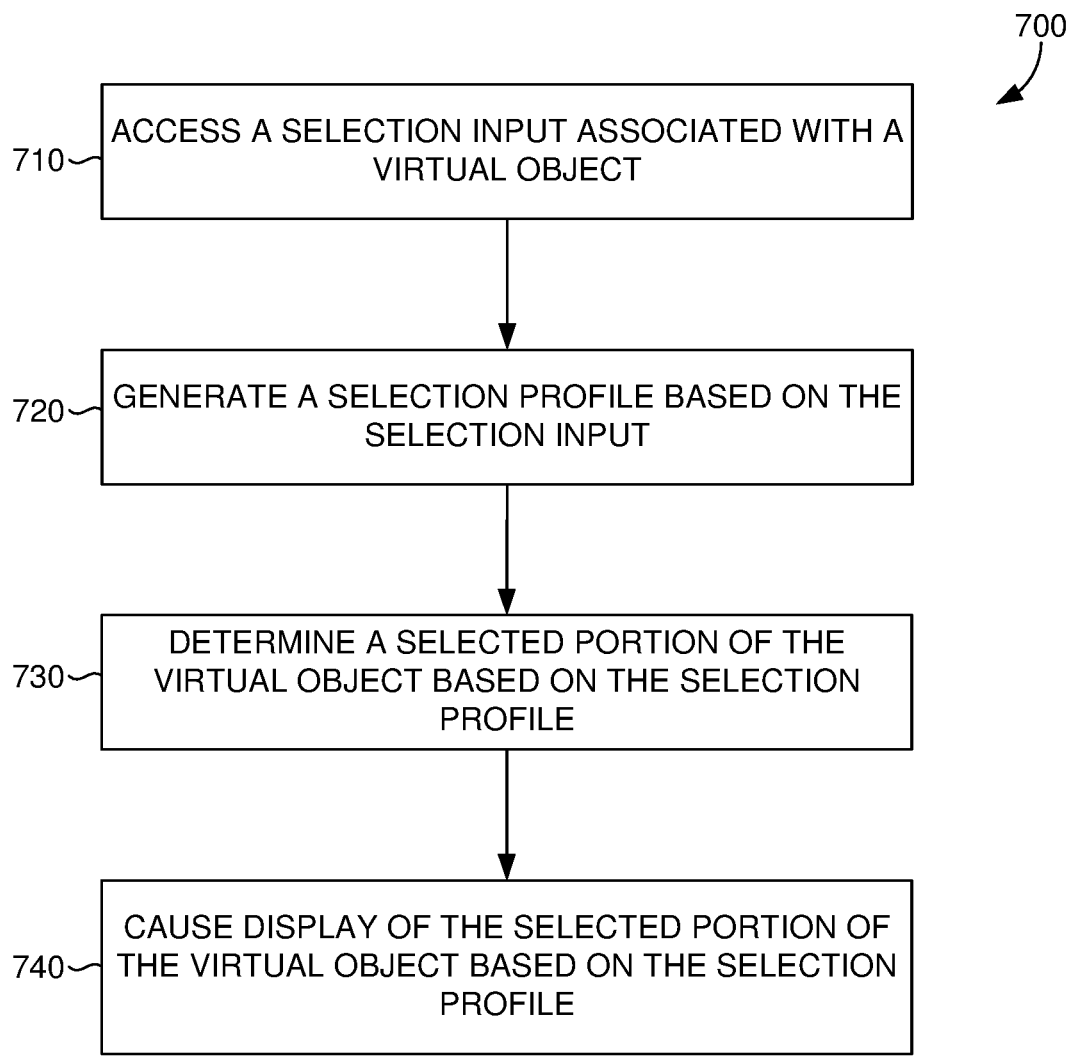
FIG. 7 is a flow diagram showing a method for implementing an interactivity system, in accordance with embodiments of the present invention.

Turning to FIG. 7, a flow diagram is provided that illustrates a method 700 for executing implementing for implementing interactivity systems. Initially, at block 710, a selection input associated with a virtual object is accessed. The selection input is based on real input associated with a selection device and virtual input associated with a mixed-reality device. At block 720, a selection profile is generated based on the selection input. The selection profile comprises one or more selection profile attributes for isolating a portion of the virtual object. At block 730, a selected portion of the virtual object is determined based on the selection profile. At block 704, the selected portion of the virtual object is caused to be displayed based on the selection profile.

Figure 8:
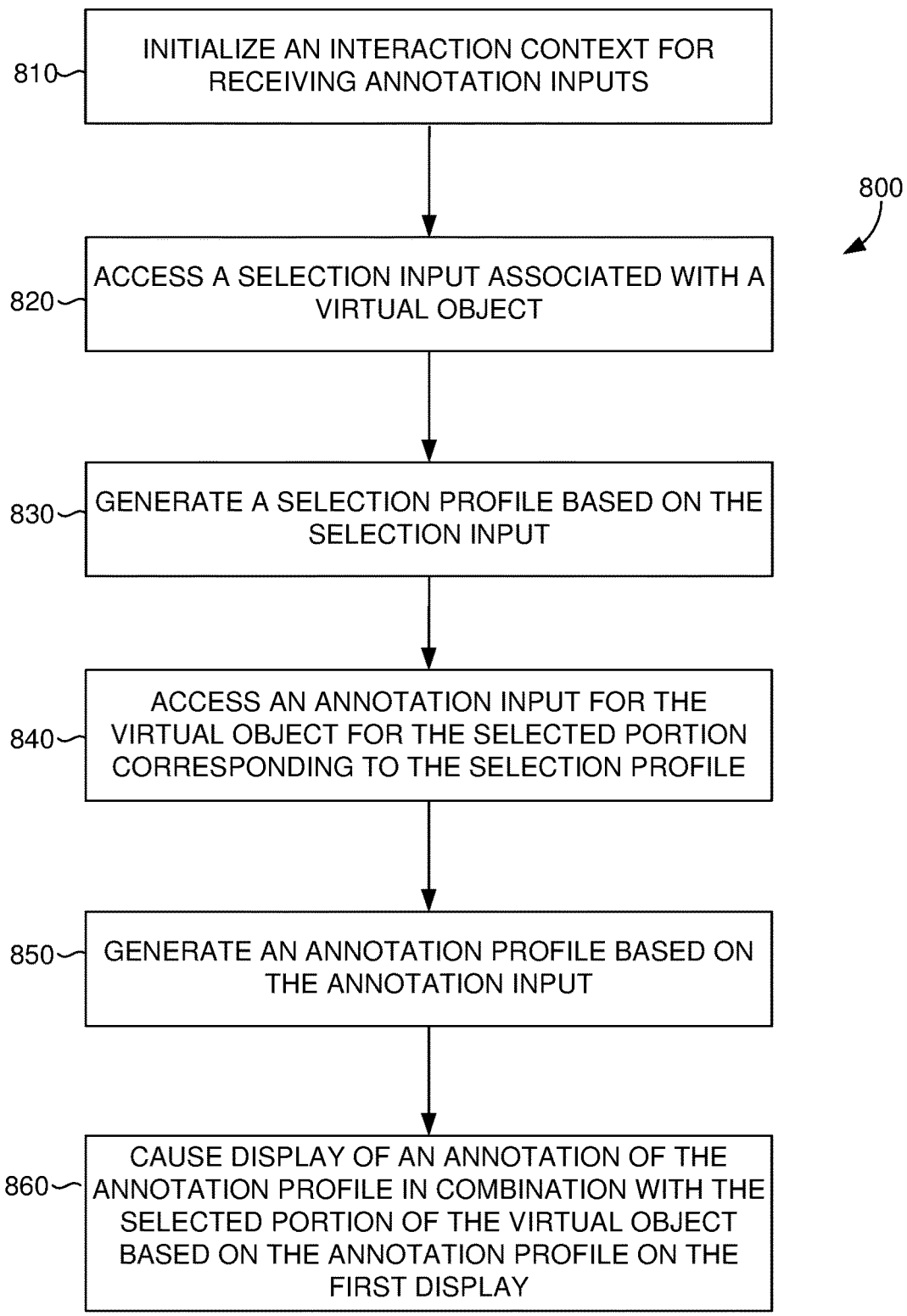
FIG. 8 is a flow diagram showing a method for implementing an interactivity system, in accordance with embodiments of the present invention.

Turning to FIG. 8, a flow diagram is provided that illustrates a method 800 for executing implementing for implementing interactivity systems. Initially at block 810, an interaction context for receiving annotation inputs is initialized. At block 820, a selection input associated with a virtual object is accessed. The selection input is based on real input associated with an annotation device and virtual input associated with a mixed-reality device, the annotation device having a first display that displays the virtual object and the mixed-reality device having a second display that displays the virtual object. At block 830, a selection profile is generated based on the selection input. The selection profile is based on a slice representing a cross section of the virtual object. The selection profile comprises one or more selection profile attributes for isolating a portion of the virtual object. At block 840, an annotation input for the virtual object for the selected portion corresponding to the selection profile is accessed. At block 850, an annotation profile is generated based on the annotation input. The annotation profile comprises one or more annotation profile attributes for annotating a portion of the virtual object. At block 860, an annotation of the annotation profile in combination with the selected portion of the virtual object based on the annotation profile is caused to be displayed on the first display.

Figure 9:
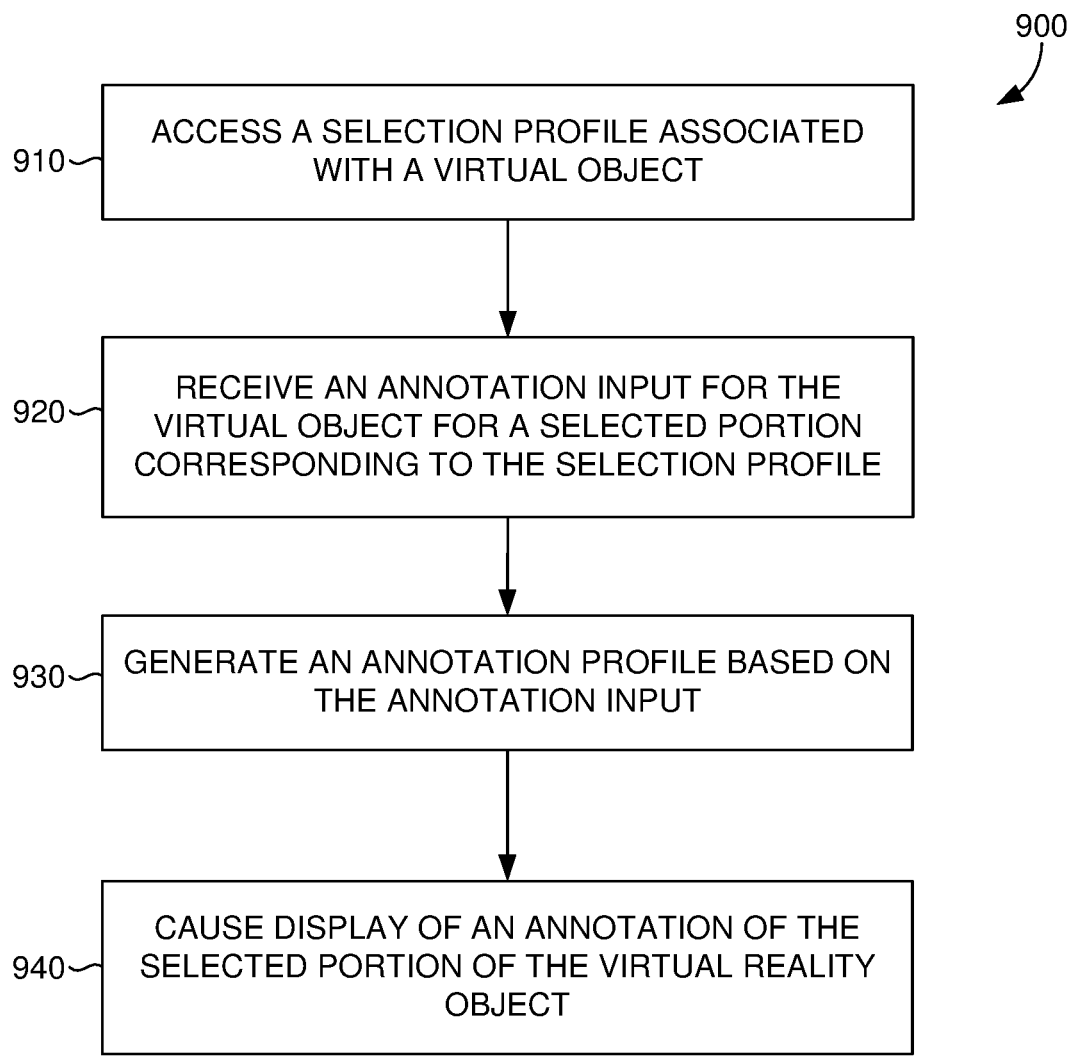
FIG. 9 is a flow diagram showing a method for implementing an interactivity system, in accordance with embodiments of the present invention.

Turning to FIG. 9, a flow diagram is provided that illustrates a method 900 for executing implementing for implementing interactivity systems. Initially, at block 910, a selection profile associated with a virtual object is accessed. The selection profile comprises one or more selection profile attributes for isolating a portion of the virtual object. At block 920, an annotation input for the virtual object is received for a selected portion corresponding to the selection profile. At block 930, an annotation profile is generated based on the annotation input. The annotation profile comprises one or more annotation profile attributes for annotating a portion of the virtual object. At block 940, an annotation of the selected portion of the virtual reality object is caused to be displayed.

With reference to the multi-device mixed interactivity system, supports paired mixed-input devices for interacting with and controlling virtual objects using displays, real inputs and virtual inputs, sensors, and passive and active haptic feedback associated with the paired mixed-input devices. The multi-device mixed interactivity system components refer to integrated components for multi-device mixed interactivity. The integrated components refer to the hardware architecture and software framework that support distributed traffic management functionality using distributed the traffic management system 100. The hardware architecture refers to physical components and interrelationships thereof and the software framework refers to software providing functionality that can be implemented with hardware embodied on a device. The end-to-end software-based multi-device mixed interactivity system can operate within the multi-device mixed interactivity system components to operate computer hardware to provide multi-device mixed interactivity system functionality. As such, the multi-device mixed interactivity system components can manage resources and provide services for the multi-device mixed interactivity system functionality. Any other variations and combinations thereof are contemplated with embodiments of the present invention.

By way of example, the multi-device mixed interactivity system can include an API library that includes specifications for routines, data structures, object classes, and variables may support the interaction between the hardware architecture of the components and the software framework of the multi-device mixed interactivity system. These APIs include configuration specifications for the multi-device mixed interactivity system such that the different components therein can communicate with each other in the multi-device mixed interactivity system, as described herein.

Figure 10:
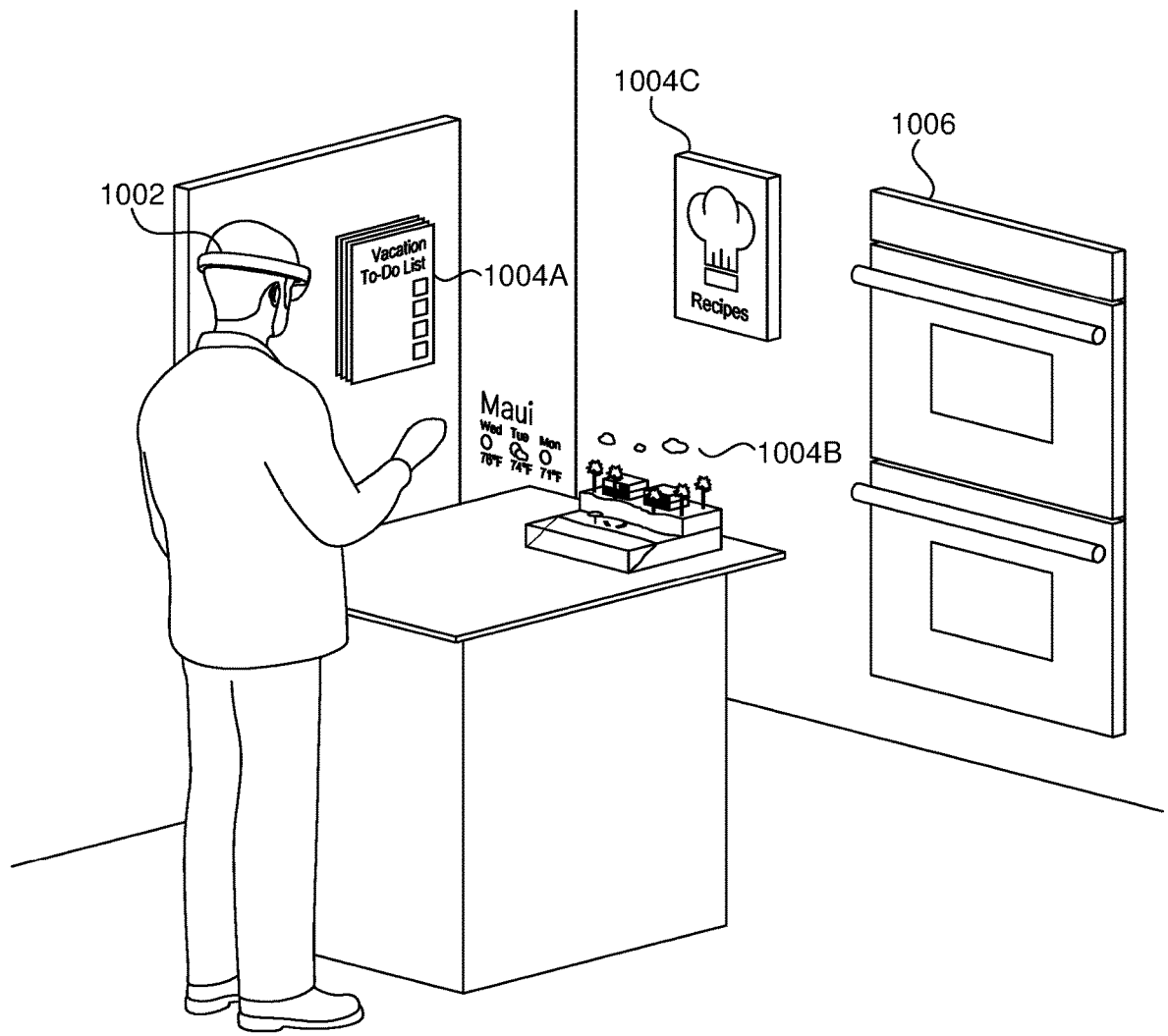
FIG. 10 is an illustrated diagram showing exemplary augmented reality images of a head-mounted display device, in accordance with embodiments of the present invention.

With reference to FIG. 10, exemplary images of a head-mounted display (HMD) device 1002 are depicted. Augmented reality images (e.g., 1004A, 1004B and 1004C), comprising corresponding virtual images provided by the HMD 1002 device, generally include the virtual images that appear superimposed on a background and may appear to interact with or be integral with the background 1006. The background 1006 is comprised of real-world scene, e.g., a scene that a user would perceive without augmented reality image emitted by the HMD 1002 device. For example, an augmented reality image can include the recipe book icon 1004C that appears superimposed and hanging in mid-air in front of the cooking oven or wall of the background 1006.

Figure 11:
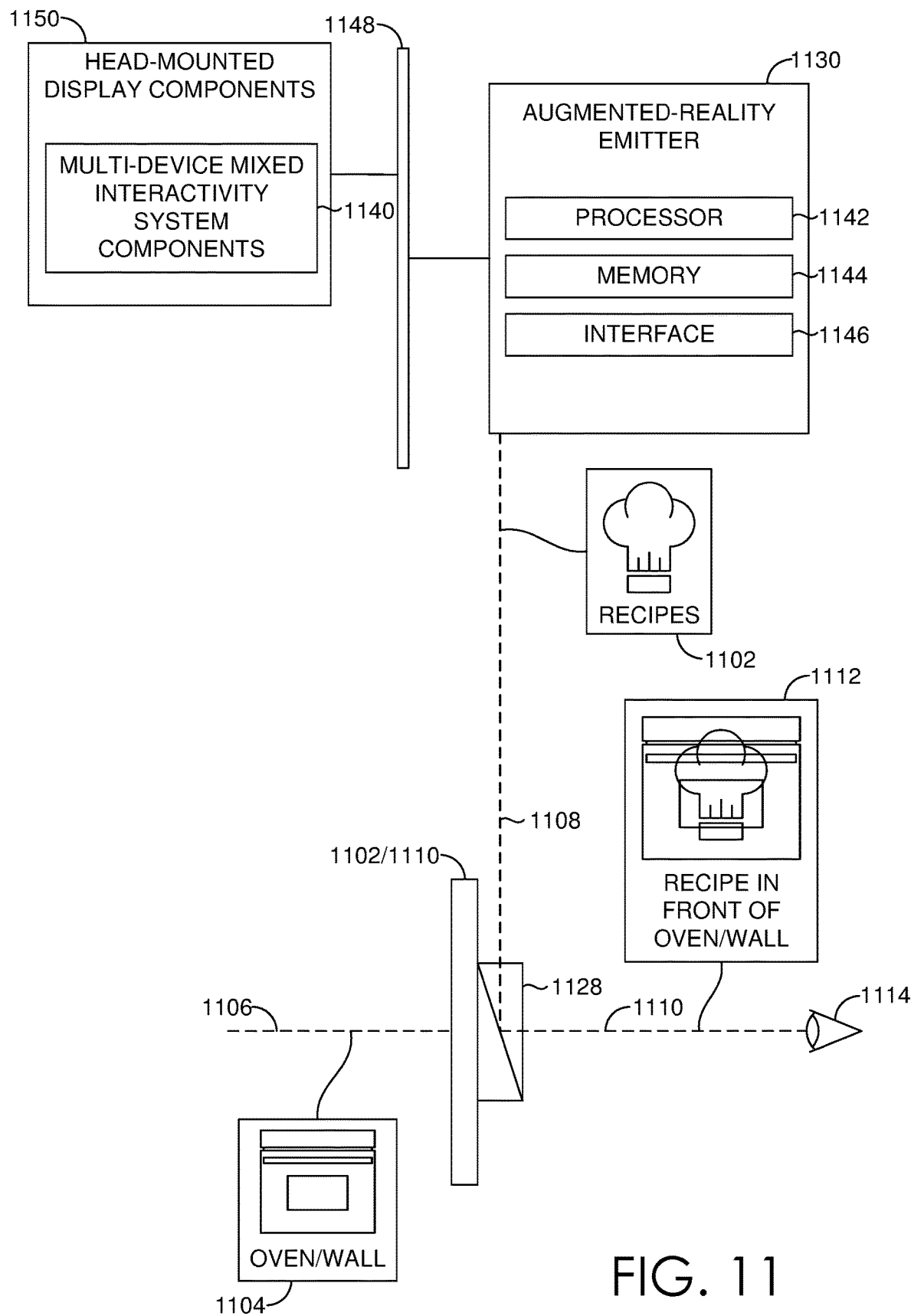
FIG. 11 is a block diagram of an exemplary head-mounted display device, in accordance with embodiments of the present invention.

Turning to FIG. 11, the HMD device 1102 having the multi-device mixed interactivity system components 1140 is described in accordance with an embodiment described herein. The HMD device 1102 includes a see-through lens 1110 which is placed in front of a user's eye 1114, similar to an eyeglass lens. It is contemplated that a pair of see-through lenses 1110 can be provided, one for each eye 1114. The lens 1110 includes an optical display component 1128, such as a beam splitter (e.g., a half-silvered mirror). The HMD device 1102 includes an augmented reality emitter 1130 that facilitates projecting or rendering the of augmented reality images. Amongst other components not shown, the HMD device also includes a processor 1142, memory 1144, interface 1146, a bus 1148, and additional HMD components 1150. The augmented reality emitter 1130 emits light representing a virtual image 1102 exemplified by a light ray 1108. Light from the real-world scene 1104, such as a light ray 1106, reaches the lens 1110. Additional optics can be used to refocus the virtual image 1102 so that it appears to originate from several feet away from the eye 1114 rather than one inch away, where the display component 1128 actually is. The memory 1144 can contain instructions which are executed by the processor 1142 to enable the augmented reality emitter 1130 to perform functions as described. One or more of the processors can be considered to be control circuits. The augmented reality emitter communicates with the additional HMD components 1150 using the bus 1148 and other suitable communication paths.

Light ray representing the virtual image 1102 is reflected by the display component 1128 toward a user's eye, as exemplified by a light ray 1110, so that the user sees an image 1112. In the augmented-reality image 1112, a portion of the real-world scene 1104, such as, a cooking oven is visible along with the entire virtual image 1102 such as a recipe book icon. The user can therefore see a mixed-reality or augmented-reality image 1112 in which the recipe book icon is hanging in front of the cooking oven in this example.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Having described embodiments of the present invention, an exemplary operating environment in which embodiments of the present invention may be implemented is described below in order to provide a general context for various aspects of the present invention. Referring initially to FIG. 12 in particular, an exemplary operating environment for implementing embodiments of the present invention is shown and designated generally as computing device 1200. Computing device 1200 is but one example of a suitable computing environment and is not intended to suggest any limitation as to the scope of use or functionality of the invention. Neither should the computing device 1200 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 12, computing device 1200 includes a bus 1210 that directly or indirectly couples the following devices: memory 1212, one or more processors 1214, one or more presentation components 1216, input/output ports 1218, input/output components 1220, and an illustrative power supply 1222. Bus 1210 represents what may be one or more busses (such as an address bus, data bus, or combination thereof). Although the various blocks of FIG. 12 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 12 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 12 and reference to "computing device."

Computing device 1200 typically includes a variety of computer-readable media. Computer-readable media can be any available media that can be accessed by computing device 1200 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1200. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1212 includes computer storage media in the form of volatile and/or nonvolatile memory. The memory may be removable, non-removable, or a combination thereof. Exemplary hardware devices include solid-state memory, hard drives, optical-disc drives, etc. Computing device 1200 includes one or more processors that read data from various entities such as memory 1212 or I/O components 1220. Presentation component(s) 1216 present data indications to a user or other device. Exemplary presentation components include a display device, speaker, printing component, vibrating component, etc.

I/O ports 1218 allow computing device 1200 to be logically coupled to other devices including I/O components 1220, some of which may be built in. Illustrative components include a microphone, joystick, game pad, satellite dish, scanner, printer, wireless device, etc.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the interactivity system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. One or more computer storage media having computer-executable instructions embodied thereon that, when executed, by one or more processors, cause the one or more processors to perform a method for implementing multi-device mixed interactivity systems, the method comprising:
generating, for a virtual object, a virtual space input as a selection input based on integrating real device space tracker data of an annotation device and virtual device space tracker data of a mixed reality device, wherein integrating the real device space tracker data and the virtual device space tracker data supports at least two of the following interaction context selections:
(1) a freehand selection from a touchscreen input of a first display of the virtual object,
(2) a selection of the virtual object based on the annotation device, corresponding to the real device space tracker data not intersecting with the virtual object,
(3) a selection of the virtual object based on the annotation device, corresponding to the real device space tracker data intersection with the virtual object, and
(4) a volume-based selection of the virtual object to generate the selection input;
wherein one or more selected portions of the virtual object, which are based on the selected input, can be isolated for display on a first display of the annotation device and a second display of the mixed reality device;
generating an annotation based on an annotation input associated with a selected portion of the virtual object, wherein the selected portion is identified based on the selection input; and
causing display of the annotation in combination with the selected portion of the virtual object on the first display.

2. The media of claim 1, wherein in the freehand slice annotation context the selection input is determined based on motion data associated with moving the annotation device relative to the virtual object to make the selection input based on a slice to generate the selection profile.

3. The media of claim 1, wherein a display configuration of the virtual object on the first display substantially mirrors a display configuration of the virtual object on the second display, wherein the selection input is received based on a direct interaction with the virtual object on the second display using the annotation device.

4. The media of claim 1, wherein a display configuration of the virtual object on the first display is independent of the display configuration of the virtual object on the second display, wherein the selection input is received based on an indirect interaction relative to the virtual object on the second display using the annotation device.

5. The media of claim 1, further comprising:
receiving a control input to modify the annotation input, wherein the control input is received using the annotation device or the mixed-reality device;
modifying the at least one annotation profile attribute based on the control input; and
updating the annotation profile based on the modification.

6. The media of claim 1, further comprising:
receiving a control to input modify a display configuration of the virtual object on the second display;
modifying the display configuration of the virtual object based on the control input; and
updating the annotation based on an annotation input received on the modified display configuration of the virtual object on the second display.

7. The media of claim 1, further comprising:
based on the annotation input, determining an annotation instruction for processing the annotation; and
executing an operation associated with the annotation based on the annotation instruction.

8. The media of claim 1, wherein the annotation input is associated with an annotation profile that is a compound annotation profile, wherein the annotation input for the compound annotation profile comprises a first annotation input and a second annotation input, such that, the compound annotation profile is generated based on the first annotation input and the second annotation input.

9. A multi-device mixed interactivity system comprising:
one or more computer processors; and
computer memory storing computer-useable instructions that, when used by the one or more computer processors, cause the one or more computer processors to perform operations comprising:
  generating, for a virtual object, a virtual space input as a selection input based on integrating real device space tracker data of an annotation device and virtual device space tracker data of a mixed reality device, wherein integrating the real device space tracker data and the virtual device space tracker data supports at least two of the following interaction context selections:
    (1) a freehand selection from a touchscreen input of a first display of the virtual object,
    (2) a selection of the virtual object based on the annotation device, corresponding to the real device space tracker data not intersecting with the virtual object,
    (3) a selection of the virtual object based on the annotation device, corresponding to the real device space tracker data intersection with the virtual object, and
    (4) a volume-based selection of the virtual object to generate the selection input;
  wherein one or more selected portions of the virtual object, which are based on the selected input, can be isolated for display on a first display of the annotation device and a second display of the mixed reality device;
  generating an annotation based on an annotation input associated with a selected portion of the virtual object, wherein the selected portion is identified based on the selection input; and
  causing display of the annotation in combination with the selected portion of the virtual object on the first display.

10. The system of claim 9, further comprising a stamp interaction context, wherein when the interaction context is a stamp annotation context, the operations further comprise:
  accessing, after receiving the annotation input, a selection input associated with the virtual object, wherein the selection input is based on a real input and the virtual input; and
  generating a selection profile based on the selection input, wherein the selection profile comprises one or more selection profile attributes for isolating the selection portion of the virtual object.

11. The system of claim 9, wherein when the interaction context is a freehand slice annotation context or a freehand annotation context, the operations further comprise
  accessing, before receiving the annotation input, the selection input associated with the virtual object, wherein the selection input is based on the real input and the virtual input; and
  generating the selection profile based on the selection input, wherein the selection profile comprises one or more selection profile attributes for isolating the selection portion of the virtual object.

12. The system of claim 9, the operations further comprising:
  receiving an additional input on one or more input interfaces, wherein an input interface is selected from the following:
    a gaze-based input interface for receiving the additional input;
    a speech-based input interface for receiving the additional input; and
    a mapped-based input interface for receiving the additional input, wherein a mapped-based selection is based on a mapping between a touchscreen surface of the mobile device relative to the virtual object on the second display.

13. The system of claim 9, the operations further comprising:
  generating interactivity feedback based on the annotation input, the interactivity feedback is selected from the following:
    the interactivity feedback comprising causing display of visual feedback associated with the annotation, wherein the visual feedback comprises visual elements that distinguish the annotation from other portions of the virtual object; and
    the interactivity feedback comprising causing haptic feedback associated with receiving the annotation input, wherein the haptic feedback corresponds to operations or annotation inputs for subsections of the virtual object.

14. The system of claim 10, the operations further comprising:
  generating a compound annotation profile, wherein the annotation input for the compound annotation profile comprises a first annotation input and a second annotation input, such that, the compound annotation profile is generated based on the first annotation input and the second annotation input,
  wherein the first annotation input is received from the annotation device and the second annotation input is received from another annotation device in a collaborative annotation context.

15. A computer-implemented method for implementing multi-device mixed interactivity systems, the method comprising:
  generating, for a virtual object, a virtual space input as a selection input based on integrating real device space tracker data of an annotation device and virtual device space tracker data of a mixed reality device, wherein integrating the real device space tracker data and the virtual device space tracker data supports at least two of the following interaction context selections:
    (1) a freehand selection from a touchscreen input of a first display of the virtual object,
    (2) a selection of the virtual object based on the annotation device, corresponding to the real device space tracker data not intersecting with the virtual object,
    (3) a selection of the virtual object based on the annotation device, corresponding to the real device space tracker data intersection with the virtual object, and
    (4) a volume-based selection of the virtual object to generate the selection input;
  wherein one or more selected portions of the virtual object, which are based on the selected input, can be isolated for display on a first display of the annotation device and a second display of the mixed reality device;
  generating an annotation based on an annotation input associated with a selected portion of the virtual object, wherein the selected portion is identified based on the selection input; and causing display of the annotation in combination with the selected portion of the virtual object on the first display.

16. The method of claim 15, further comprising:
initializing an interaction context for receiving annotation inputs, after accessing the selection input, wherein the interaction context is the freehand slice annotation context,
wherein the selection input is determined based on motion data associated with moving the selection device relative to the virtual object to make a selection input to generate a selection profile, and
wherein the selection profile is based on a slice representing a cross section of the virtual object.

17. The method of claim 15, wherein the annotation device includes a first display that displays the virtual object and the mixed-reality device includes a second display that displays the virtual object.

18. The method of claim 17, wherein based on a first context a display configuration of the virtual object on the first display substantially mirrors a display configuration of the virtual object on the second display; and
wherein based on a second context a display configuration of the virtual object on the first display is independent of the display configuration of the virtual object on the second display.

19. The method of claim 15, further comprising:
receiving a control input to modify a display configuration of the virtual object on the second display;
modifying the display configuration of the virtual object based on the control input; and
updating the annotation based on an annotation input received on the modified display configuration of the virtual object on the second display.

20. The method of claim 15, wherein the annotation input is associated with an annotation profile that is a compound annotation profile, wherein the annotation input for the compound annotation profile comprises a first annotation input and a second annotation input, such that, the compound annotation profile is generated based on the first annotation input and the second annotation input.

* * * * *